US012581177B2

(12) United States Patent
Park et al.

(10) Patent No.: US 12,581,177 B2
(45) Date of Patent: Mar. 17, 2026

(54) CAMERA DEVICE

(71) Applicant: LG INNOTEK CO., LTD., Seoul (KR)

(72) Inventors: Sang Ok Park, Seoul (KR); Jung Cheol Kim, Seoul (KR); Hyun Soo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 70 days.

(21) Appl. No.: 18/562,103

(22) PCT Filed: May 13, 2022

(86) PCT No.: PCT/KR2022/006880
§ 371 (c)(1),
(2) Date: Nov. 17, 2023

(87) PCT Pub. No.: WO2022/245054
PCT Pub. Date: Nov. 24, 2022

(65) Prior Publication Data
US 2024/0244306 A1 Jul. 18, 2024

(30) Foreign Application Priority Data
May 21, 2021 (KR) ......................... 10-2021-0065813

(51) Int. Cl.
*H04N 23/54* (2023.01)
*H04N 23/51* (2023.01)
(Continued)

(52) U.S. Cl.
CPC ............. *H04N 23/54* (2023.01); *H04N 23/51* (2023.01); *H04N 23/55* (2023.01); *H04N 23/53* (2023.01)

(58) Field of Classification Search
CPC ........ H04N 23/54; H04N 23/51; H04N 23/55; H04N 23/53; H04N 23/687; H04N 23/57;
(Continued)

(56) References Cited

U.S. PATENT DOCUMENTS 7,881,598 B1 * 2/2011 Wu ........................... G03B 3/10
396/55
10,768,437 B2 9/2020 Park et al.
(Continued)

FOREIGN PATENT DOCUMENTS

EP 3 817 362 A1 5/2021
JP 2020-30306 A 2/2020
(Continued)

OTHER PUBLICATIONS

International Search Report dated Aug. 24, 2022 in International Application No. PCT/KR2022/006880.
(Continued)

*Primary Examiner* — Abdelaaziz Tissire
(74) *Attorney, Agent, or Firm* — Saliwanchik, Lloyd & Eisenschenk

(57) ABSTRACT

The present embodiment relates to a camera device comprising: a first substrate; a base being disposed on the first substrate; an image sensor being disposed on the first substrate to move in a direction perpendicular to an optical axis; a housing coupling with the base; a bobbin being disposed on the base and disposed to move in a direction of the optical axis; a sensing substrate being disposed in the housing; and a connection substrate connecting the image sensor and the first substrate, wherein the connection substrate may comprise a first terminal part being connected to the first substrate and a second terminal part being connected to the sensing substrate.

20 Claims, 18 Drawing Sheets

(51) Int. Cl.
  *H04N 23/53*        (2023.01)
  *H04N 23/55*        (2023.01)
(58) Field of Classification Search
  CPC ........ H04N 23/60; H04N 23/67; H04N 23/50;
        H04N 23/68; H04N 23/685; H04N 23/65;
        H04N 23/682; H04N 25/79; G03B 5/00;
            G03B 2205/0038; G03B 2205/0069;
          G03B 30/00; G03B 5/04; G03B
        2205/0015; G03B 3/10; G03B 13/36;
        G03B 2205/0007; G03B 17/12; G03B
        5/02; G03B 2205/0023; G03B 17/02;
            G03B 17/00; G03B 5/06; G03B
        2205/0053; G03B 13/34; G03B 17/55;
        G03B 3/02; H02K 41/0356; H02K 33/18;
            H05K 1/028; H05K 1/147
  See application file for complete search history.

(56)                References Cited

U.S. PATENT DOCUMENTS

| | | | | |
|---|---|---|---|---|
| 2013/0119785 | A1* | 5/2013 | Han | G02B 27/646 |
| | | | | 310/12.16 |
| 2016/0187670 | A1* | 6/2016 | Kim | G02B 7/023 |
| | | | | 359/557 |
| 2017/0289457 | A1* | 10/2017 | Hu | H02K 33/02 |
| 2018/0203203 | A1* | 7/2018 | Lee | H02K 41/0356 |
| 2019/0011723 | A1 | 1/2019 | Park et al. | |
| 2019/0107685 | A1* | 4/2019 | Kim | G02B 7/08 |
| 2021/0181455 | A1* | 6/2021 | Park | G03B 3/10 |
| 2021/0258491 | A1* | 8/2021 | Park | H04N 23/57 |

FOREIGN PATENT DOCUMENTS

| | | | | | |
|---|---|---|---|---|---|
| KR | 10-2013-0037560 | A | 4/2013 | | |
| KR | 10-2016-0000728 | A | 1/2016 | | |
| KR | 10-2016-0017910 | A | 2/2016 | | |
| KR | 10-2016-0089116 | A | 7/2016 | | |
| KR | 10-2020-0086077 | A | 7/2020 | | |
| TW | 201820600 | A | 6/2018 | | |
| TW | 202021108 | A | 6/2020 | | |
| WO | WO-2019027199 | A1 * | 2/2019 | | G03B 5/00 |
| WO | WO-2020004975 | A1 * | 1/2020 | | H04N 23/687 |

OTHER PUBLICATIONS

Supplementary European Search Report dated Apr. 29, 2025 in European Application No. 22804909.4.
Office Action dated Dec. 11, 2025 in Taiwanese Application No. 111118420.

* cited by examiner

CAMERA DEVICE

CROSS-REFERENCE TO RELATED APPLICATIONS

This application is the U.S. national stage application of International Patent Application No. PCT/KR2022/006880, filed May 13, 2022, which claims the benefit under 35 U.S.C. § 119 of Korean Application No. 10-2021-0065813, filed May 21, 2021; the disclosures of each of which are incorporated herein by reference in their entirety.

TECHNICAL FIELD

The present embodiment relates to a camera device.

BACKGROUND ART

A camera device is a device that photographs a subject as a picture or video, and is being installed in optical devices such as smartphones, drones, and vehicles.

In order to improve image quality, a camera device is required to have a handshake correction (optical image stabilization, OIS) function that corrects image shake caused by user movement.

In the camera device, the handshake correction function is performed by moving the lens in a direction perpendicular to the optical axis. However, as the diameter of the lens increases in accordance with the recent trend toward high pixel density, the weight of the lens increases, and accordingly, there is a problem in that it is difficult to secure electromagnetic force for moving the lens in a limited space.

DETAILED DESCRIPTION OF THE INVENTION

Technical Subject

The present embodiment is intended to provide a camera device that performs handshake correction by moving the image sensor.

The present embodiment is intended to provide a camera device that drives the image sensor in three axes: x-axis shift, y-axis shift, and z-axis rolling.

Technical Solution

The camera device according to this embodiment comprises: a first substrate; a base being disposed on the first substrate; an image sensor being disposed on the first substrate to move in a direction perpendicular to an optical axis; a housing coupling with the base; a bobbin being disposed on the base and disposed to move in a direction of the optical axis; a sensing substrate being disposed in the housing; and a connection substrate connecting the image sensor and the first substrate, wherein the connection substrate may comprise a first terminal part being connected to the first substrate and a second terminal part being connected to the sensing substrate.

It comprises a holder disposed on the first substrate, and the image sensor may be coupled to the holder.

The connection substrate may comprise a first coupling region being coupled to the base, a second coupling region being coupled to the holder, and a connection part connecting the first coupling region and the second coupling region.

It may comprise a Hall sensor or a driver IC being disposed in the sensing substrate.

The camera device according to the present embodiment comprises: a fixed part comprising a first substrate and a sensing substrate; a first moving part being disposed to move in an optical axis direction with respect to the fixed part; a second moving part being disposed to move in a direction perpendicular to the optical axis direction; and a connection substrate connecting the fixed part and the second moving part, wherein the connection substrate may comprise a first terminal part being connected to the first substrate and a second terminal part being connected to the sensing substrate.

The connection substrate may be moved in a direction perpendicular to the optical axis direction with respect to a first coupling region being coupled to the fixed part.

The connection substrate comprises: a connection part connected to the second moving part; an extension part extending from the connection part; and a terminal part connected to the extension part and coupled to the first substrate, wherein at least a portion of the extension part may be moved in a direction perpendicular to the optical axis direction with respect to the terminal part.

The second moving part may comprise an image sensor, and the first moving part may comprise a lens.

The camera device according to the present embodiment comprises: a fixed part comprising a main substrate and a sensing substrate; a first moving part being movably disposed to move in an optical axis direction with respect to the fixed part, and comprising a bobbin; a second moving part being movably disposed to move in a direction perpendicular to the optical axis and comprising a holder substrate; and a connection substrate connecting the fixed part and the second moving part, wherein the holder substrate is being disposed between the main substrate and the bobbin, and wherein the connection substrate may comprise a first terminal part being connected to the main substrate and a second terminal part being connected to the sensing substrate.

The connection substrate is integrally formed with the holder substrate, and the connection substrate may comprise a first bending region being bent in the optical axis direction and a second bending region being bent in a direction perpendicular to the optical axis direction.

The camera device according to the present embodiment comprises: a fixed part comprising a first substrate; a first moving part being disposed inside the fixed part and comprising a lens; a second moving part comprising an image sensor being disposed below the lens; a first driving unit for moving the first moving part in an optical axis direction; a second driving unit for moving the second moving part in a direction perpendicular to the optical axis direction; a sensing substrate being disposed in the fixed part; a sensor being disposed on the sensing substrate and detecting the movement of the first moving part; and a connection substrate electrically connecting the first substrate and the image sensor, wherein the connection substrate may comprise a first terminal part being connected to the first substrate and a second terminal part being connected to the sensing substrate.

The camera device according to the present embodiment comprises: a fixed part comprising a first substrate; a first moving part being disposed inside the fixed part and comprising a lens; a second moving part comprising an image sensor being disposed at a position corresponding to the lens; a driving magnet being disposed on the fixed part; a first coil being disposed on the first moving part at a position corresponding to the driving magnet; a second coil disposed on the second moving part at a position corresponding to the driving magnet; a connection substrate connecting the first substrate and the second moving part; a sensing substrate being disposed on the fixed part; and a driver IC being disposed in the sensing substrate and electrically connected to the first coil, wherein the connection substrate comprises a first terminal and a second terminal, wherein the first terminal of the connection substrate is connected to the first substrate, and wherein the sensing substrate may be connected to the second terminal of the connection substrate.

The first terminal and the second terminal of the connection substrate may be disposed at an outer surface of the connection substrate.

The second terminal of the connection substrate may be disposed to be spaced apart from the first terminal on the outer surface of the connection substrate.

The first terminal of the connection substrate may be disposed on the lower end of the connection substrate, and the second terminal of the connection substrate may be disposed spaced apart from the lower end of the connection substrate.

The second terminal of the connection substrate may be disposed above the first terminal in an optical axis direction.

The second moving part comprises a second substrate electrically connected to the image sensor, wherein the connection substrate comprises a connection part being connected to the second substrate, a terminal part being coupled to the first substrate, and an extension part connecting the connection part and the terminal part, wherein the first terminal and the second terminal may be disposed in the terminal part.

The camera device comprises a sensing magnet and a correction magnet being disposed opposite to each other in the first moving part, the driver IC comprises a sensor for detecting the sensing magnet, and the driver IC may be disposed to face the sensing magnet.

The camera device comprises an upper elastic member and a lower elastic member connecting the fixed part and the first moving part, the lower elastic member is disposed below the upper elastic member, the lower elastic member comprises two lower elastic members being spaced apart from each other, and the two lower elastic members may electrically connect the sensing substrate and the first coil.

The sensing substrate may comprise a first terminal being connected to the second terminal of the connection substrate, and a second terminal being connected to the two lower elastic members.

The second terminal of the connection substrate may comprise four second terminals, and the first terminal of the sensing substrate may comprise four first terminals being coupled to the four second terminals of the connection substrate.

The sensing substrate may be bent at least twice in a direction perpendicular to an optical axis direction.

The fixed part comprises a base being disposed on the first substrate, and a housing being disposed on the base, wherein the housing comprises a hole or groove being recessed in a shape corresponding to the sensing substrate, wherein a part of the connection substrate is fixed to the base, and wherein the sensing substrate may be disposed in the hole or groove of the housing.

The sensing substrate may be spaced apart from the first substrate and may be electrically connected to the first substrate through the connection substrate.

The fixed part comprises a top plate and a cover member comprising a side plate being extended from the top plate; the sensing substrate comprises a first terminal being connected to the second terminal of the connection substrate;

and the cover member is recessed from a lower end of the side plate so that it may comprise a groove exposing the first terminal of the sensing substrate.

The optical device according to the present embodiment may comprise: a main body; a camera device disposed on the body; and a display being disposed on the main body and outputting a video or image photographed by the camera device.

The camera device according to the present embodiment comprises: a fixed part comprising a first substrate; a first moving part being disposed inside the fixed part and comprising a lens; a second moving part being disposed between the first moving part and the first substrate and comprising an image sensor; a driving magnet being disposed in the fixed part; a first coil being disposed on the first moving part at a position corresponding to the driving magnet; a second coil being disposed in the second moving part at a position corresponding to the driving magnet; a connection substrate connecting the first substrate and the second moving part; a sensing magnet being disposed in the first moving part; a sensing substrate being disposed in the fixed part; and a sensor being disposed in the sensing substrate and sensing the sensing magnet, wherein the sensing substrate is coupled to the connection substrate and may be electrically connected to the first substrate through the connection substrate.

The second moving part comprises a second substrate being electrically connected to the image sensor; the connection substrate comprises a connection part being connected to the second substrate, a terminal part being coupled to the first substrate, and an extension part connecting the connection part and the terminal part; and the sensing substrate may be coupled to the terminal part of the connection substrate.

The connection substrate comprises a first terminal and a second terminal being disposed on an outer surface of the terminal part, the second terminal is disposed above the first terminal, the first terminal of the connection substrate is being connected to the first substrate, and the sensing substrate may be connected to the second terminal of the connection substrate.

The sensing substrate may be spaced apart from the first substrate.

The camera device according to the present embodiment comprises: a first substrate; a housing being disposed on the first substrate; a bobbin being disposed inside the housing; a second substrate being disposed between the bobbin and the first substrate; a holder being coupled to the second substrate; a driving magnet being disposed in the housing; a first coil being disposed in the bobbin at a position corresponding to the driving magnet; a second coil being disposed in the holder at a position corresponding to the driving magnet; a connection substrate connecting the first substrate and the second substrate; a sensing substrate being disposed in the housing; and a driver IC being disposed in the sensing substrate and being electrically connected to the first coil, wherein the connection substrate comprises a connection part connected to the second substrate, a terminal part connected to the first substrate, and an extension part connecting the connection part and the terminal part, wherein the connection substrate comprises a first terminal and a second terminal being disposed on an outer surface of the terminal part, wherein the second terminal is disposed above the first terminal, wherein the first terminal of the connection substrate is connected to the first substrate, and wherein the sensing substrate may be connected to the second terminal of the connection substrate.

5

Advantageous Effects

Through the present embodiment, interference between the sensing substrate for AF drive control and the connection substrate for electrical conduction of the image sensor can be inhibited.

In more detail, when the connection substrate is moved, the phenomenon that the connection substrate is being interfered with the sensing substrate can be inhibited.

In addition, the cover member may be assembled to the OIS assembly in a state in which the cover member is assembled to the AF assembly through the partially open structure of the cover member.

BRIEF DESCRIPTION OF DRAWINGS

Figure 9:
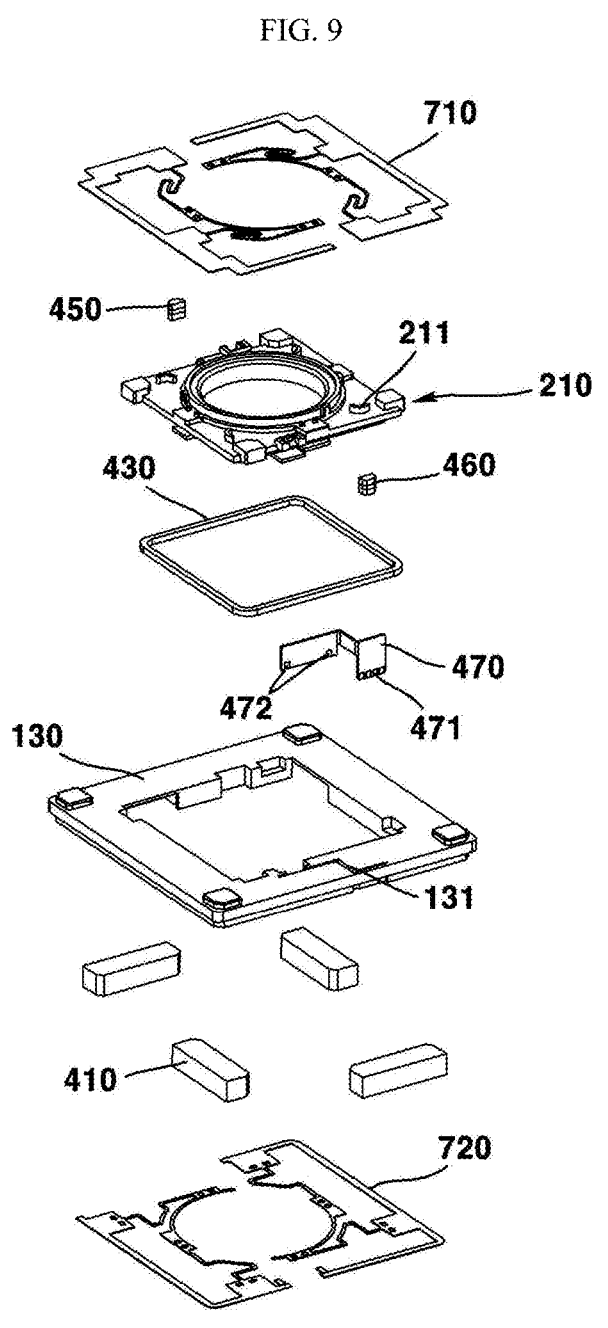

FIG. 9 is an exploded perspective view of a first moving part and related configuration of a camera device according to the present embodiment.

FIG. 12b is a partially enlarged view of FIG. 12a.

Figure 18:
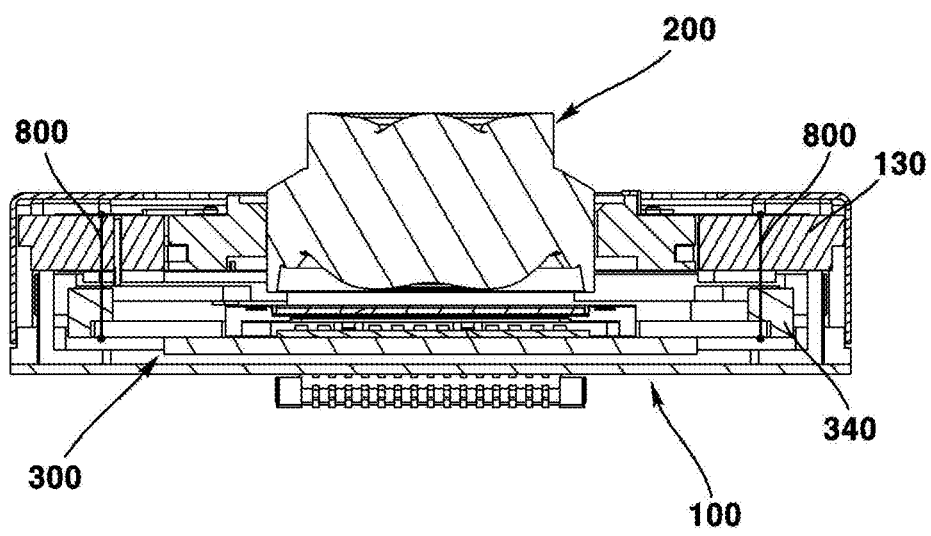
FIG. 18 is a cross-sectional view of a camera device according to the present embodiment. The wire of the camera device according to the present embodiment may be omitted in drawings other than FIG. 18. However, the wire may be illustrated and described in FIG. 18 as one configuration of a camera device according to the present embodiment.
Figure 19:
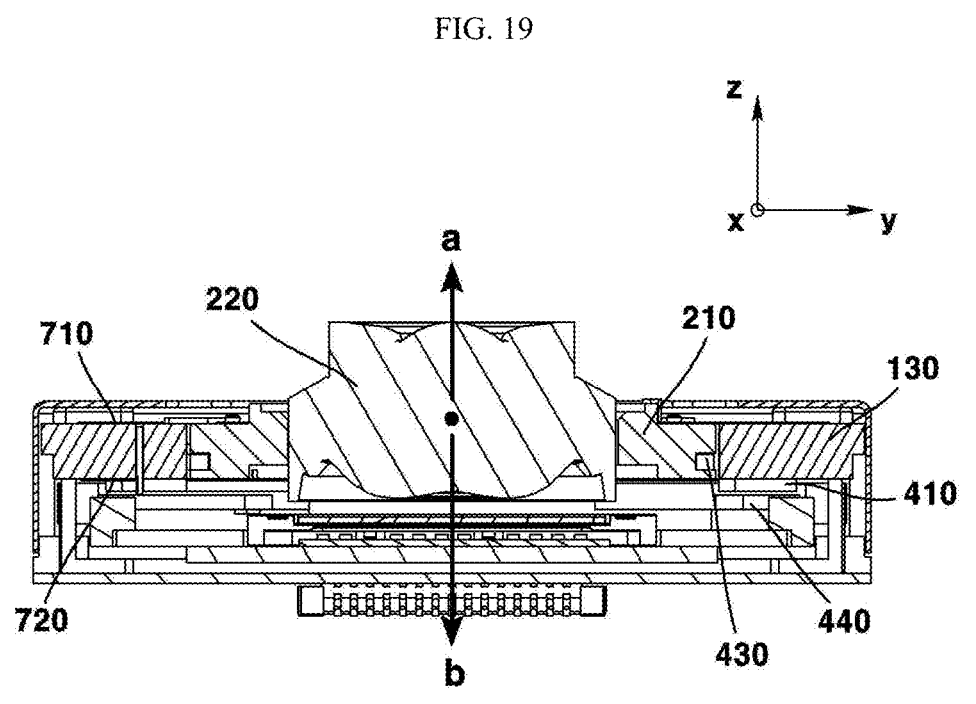

FIG. 19 is a view for explaining the operation of an autofocus function of a camera device according to the present embodiment.

Figure 20:
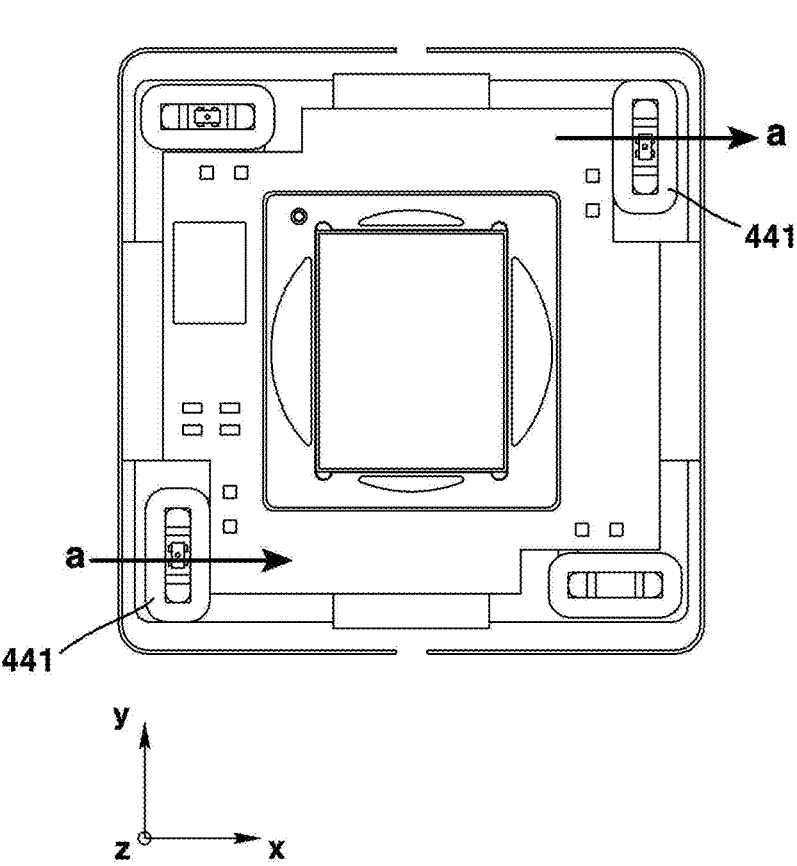
Figure 21:
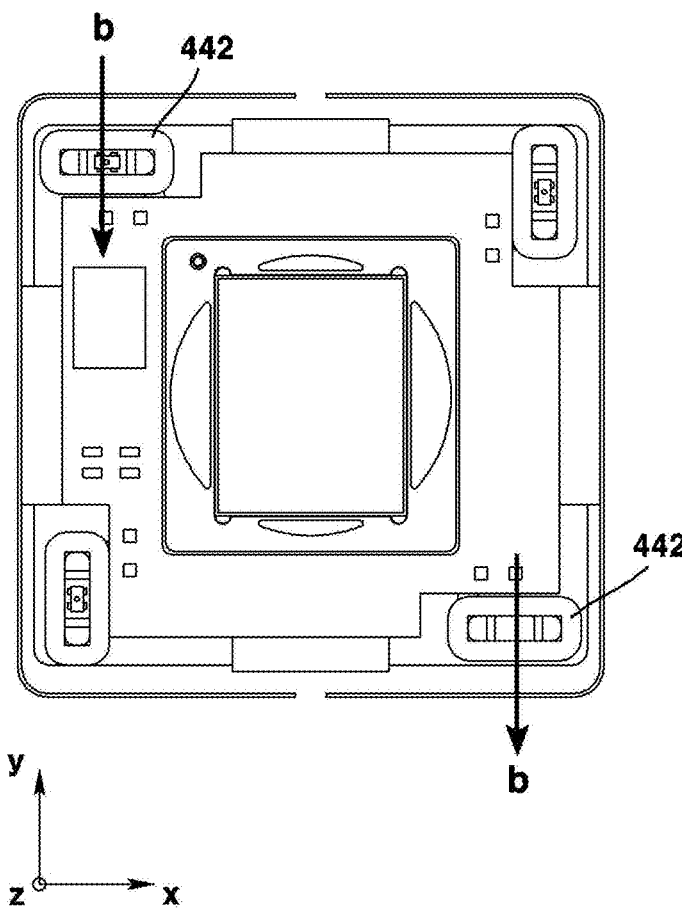
Figure 22:
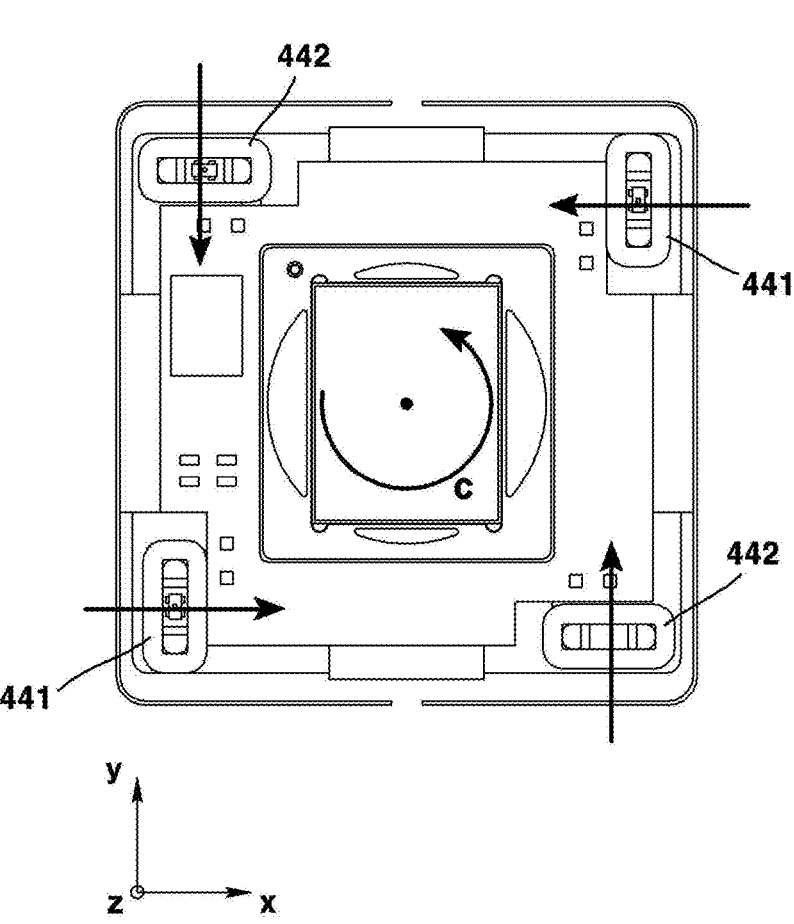

FIGS. 20 to 22 are diagrams for explaining the operation of the hand shake correction function of a camera device according to the present embodiment. In more detail, FIG. 20 is a diagram for explaining driving in which an image sensor of a camera device is shifted along the x-axis according to the present embodiment. FIG. 21 is a diagram for explaining driving in which an image sensor of a camera device according to the present embodiment is shifted along the y-axis. FIG. 22 is a view for explaining driving in which an image sensor of a camera device according to the present embodiment is rolled around the z-axis.

Figure 23:
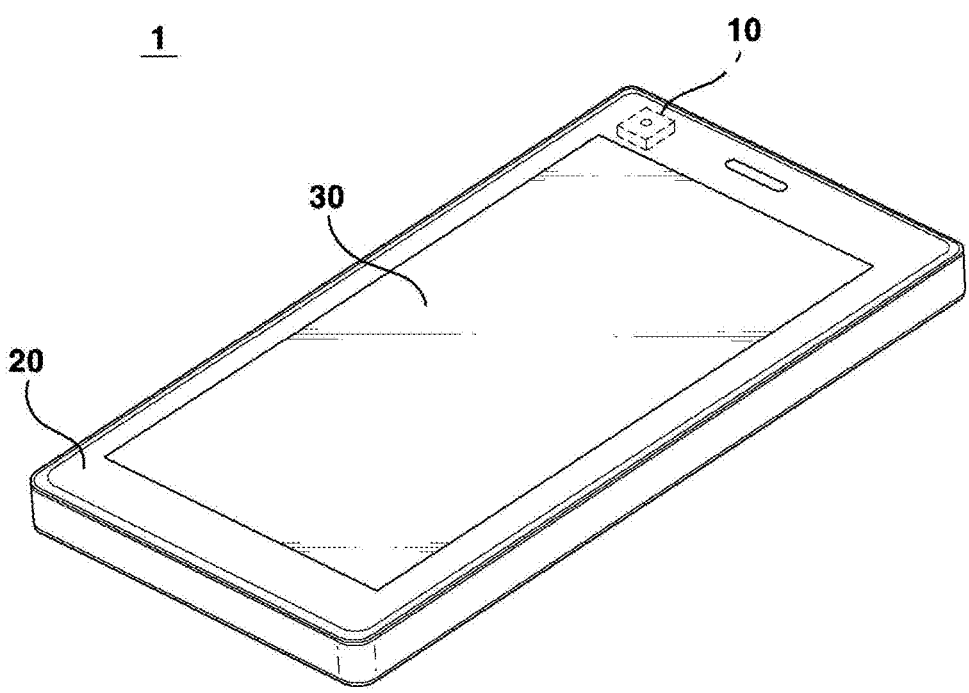

FIG. 23 is a perspective view of an optical device according to the present embodiment.

Figure 24:
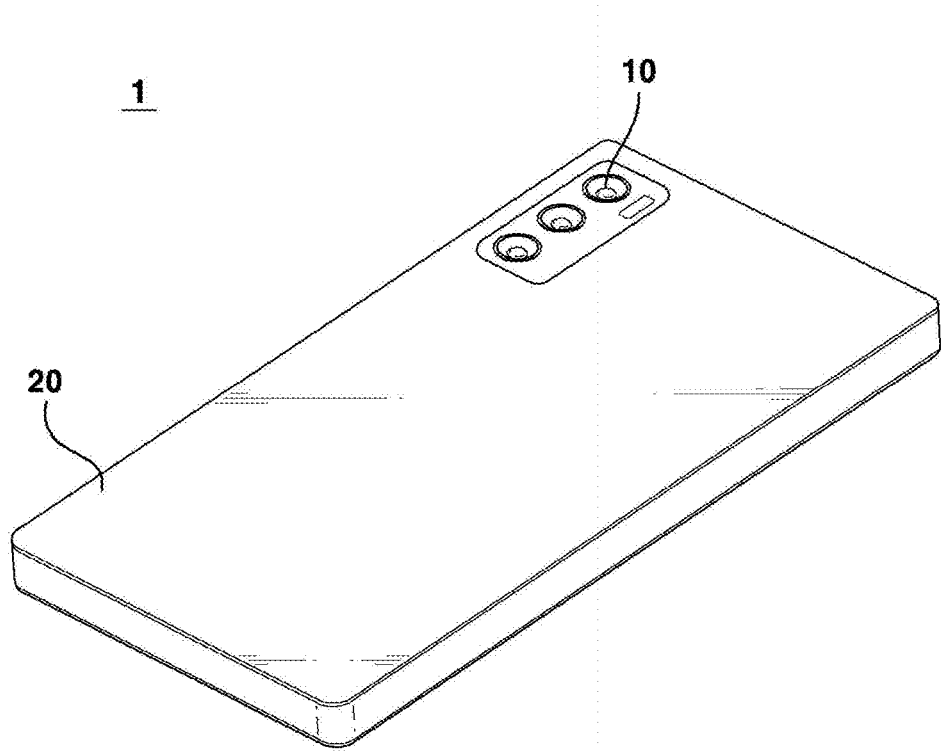

FIG. 24 is a perspective view of an optical device according to the present embodiment as viewed from a different direction from FIG. 23.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a camera device according to the present embodiment will be described with reference to the drawings.

Figure 1:
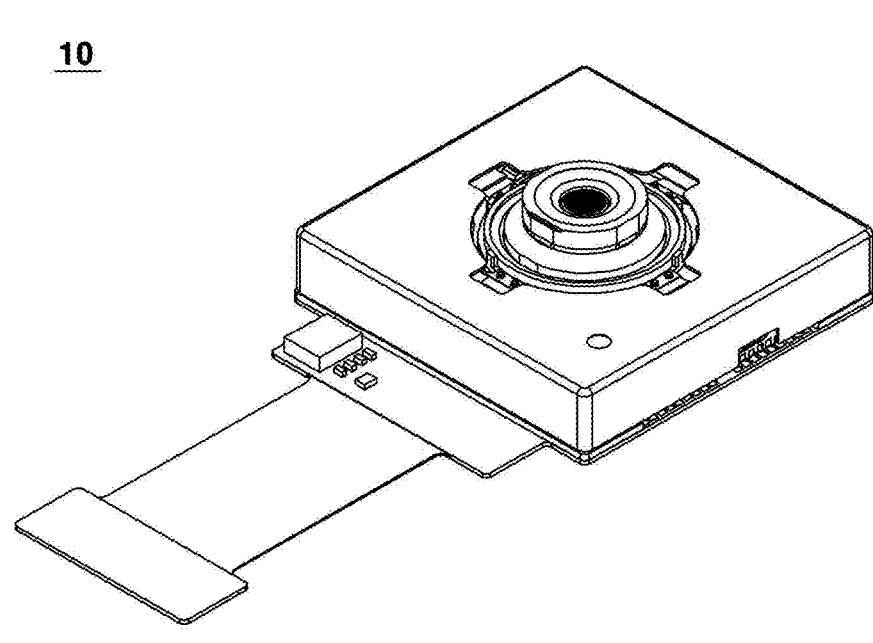
FIG. 1 is a perspective view of a camera device according to the present embodiment.
Figure 2:
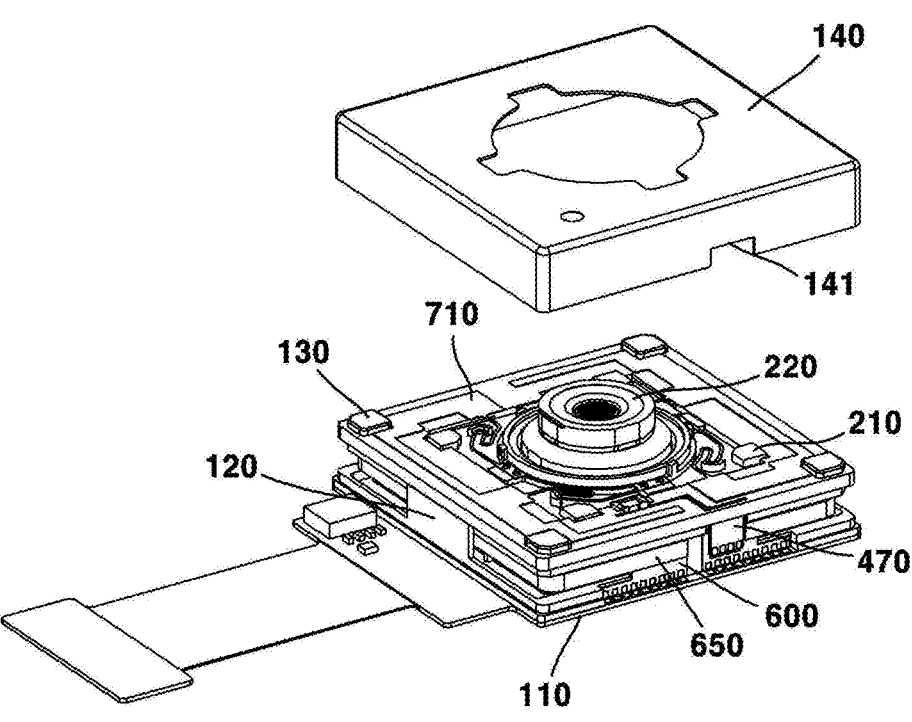
FIG. 2 is a perspective view of a state in which the cover member is omitted from the camera device according to the present embodiment.
Figure 3:
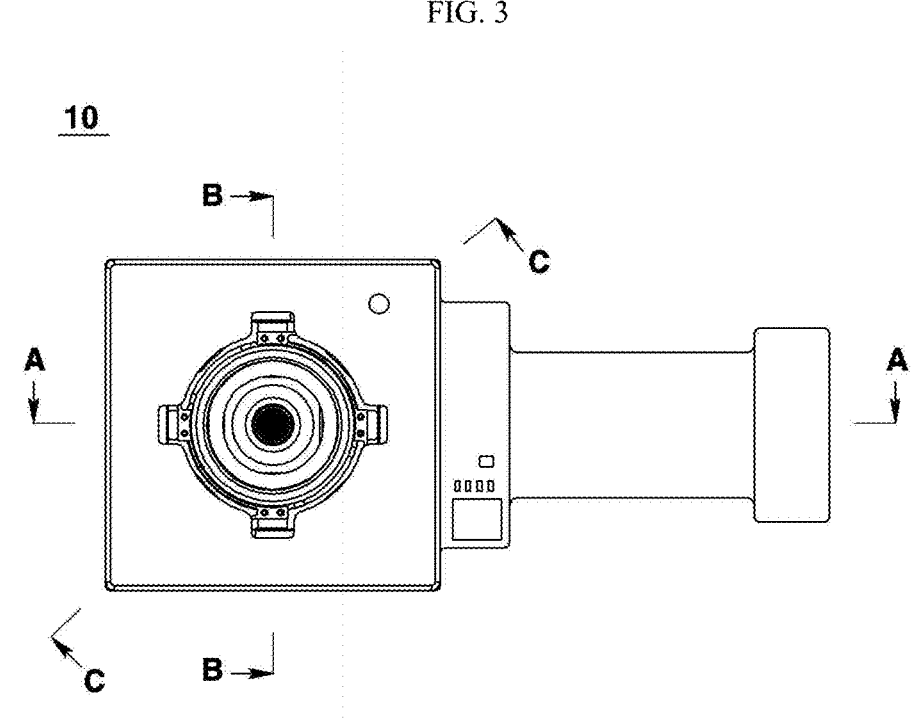
FIG. 3 is a plan view of a camera device according to the present embodiment.
Figure 4:
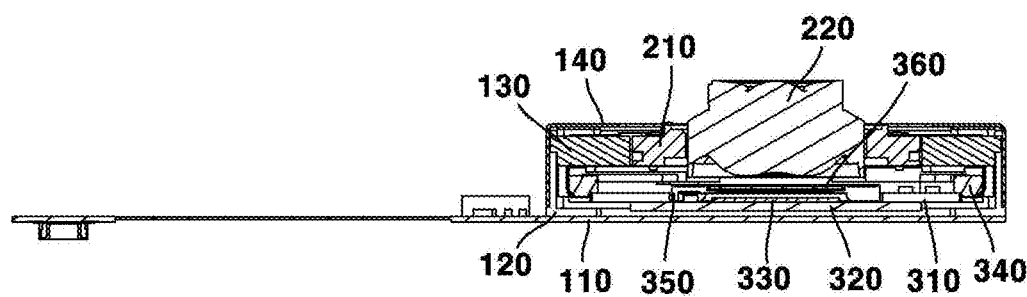
FIG. 4 is a cross-sectional view taken along line A-A of FIG. 3.
Figures 5, 6:
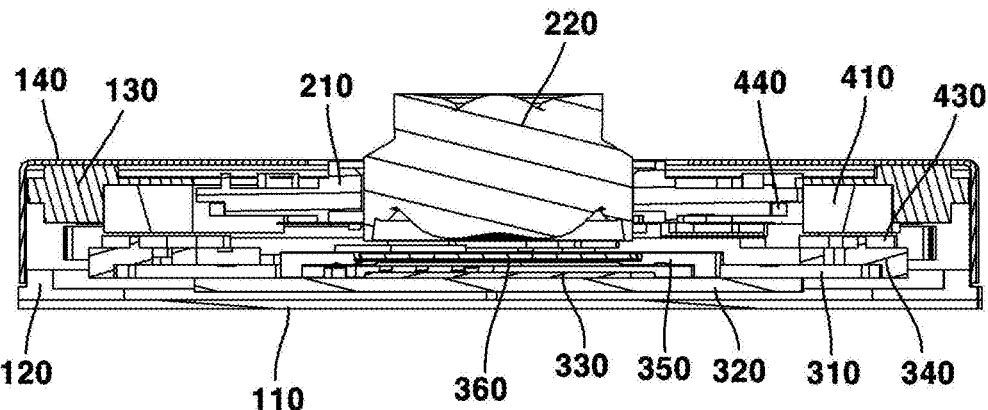
FIG. 5 is a cross-sectional view taken along line B-B of FIG. 3.
FIG. 6 is a cross-sectional view taken along line C-C of FIG. 3.
Figure 7:
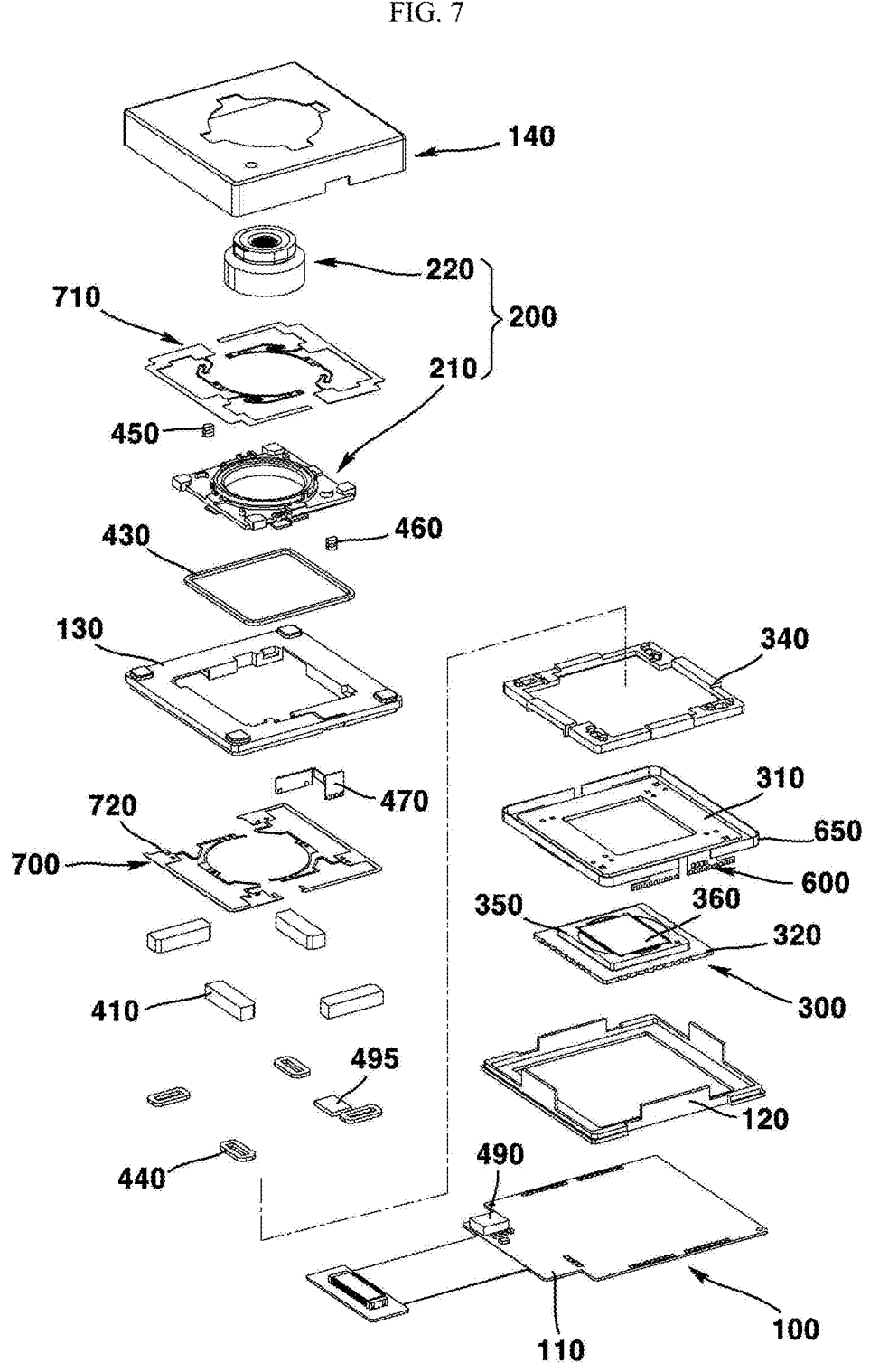
FIG. 7 is an exploded perspective view of a camera device according to the present embodiment.
Figure 8:
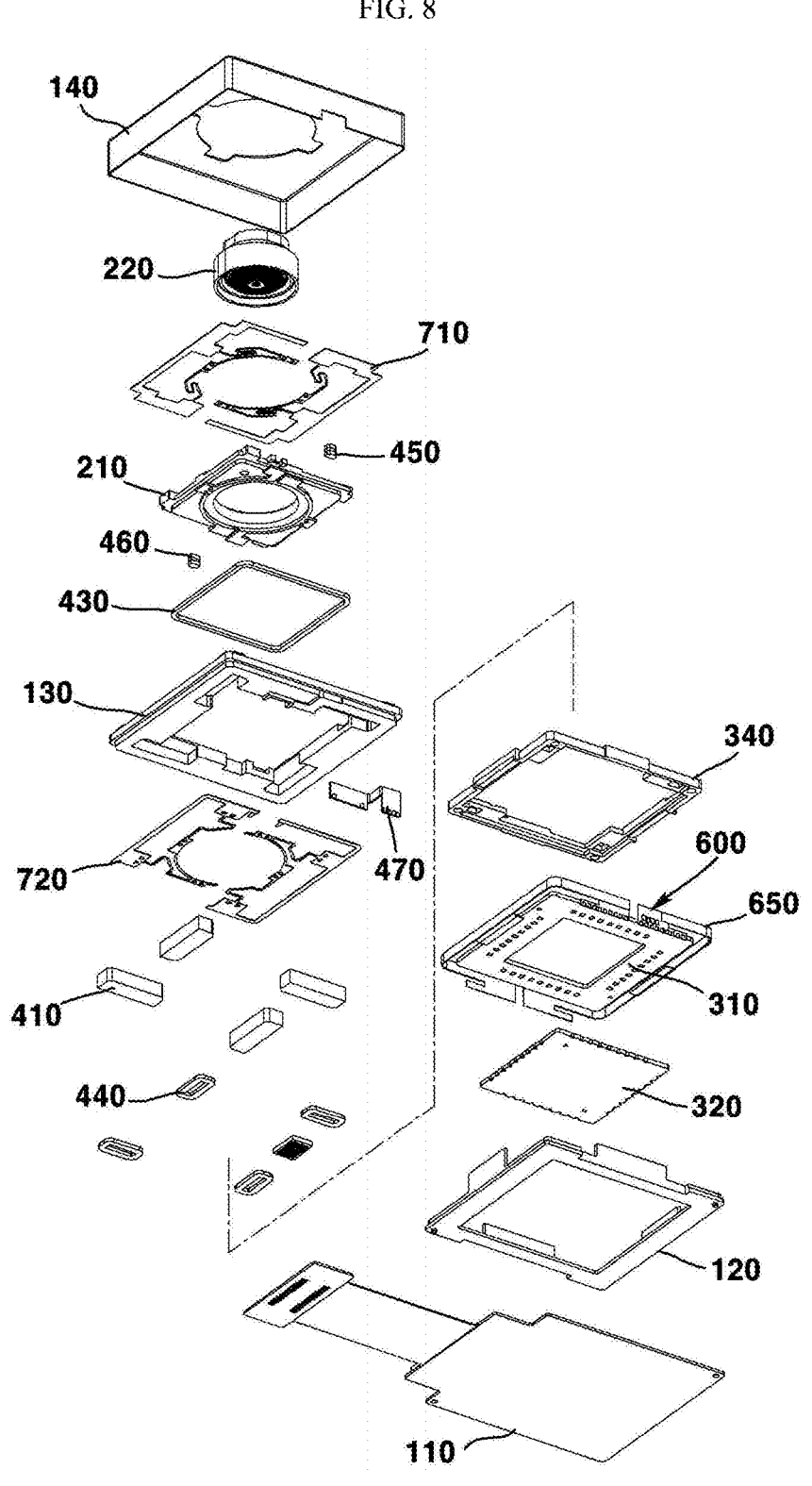
FIG. 8 is an exploded perspective view of a camera device according to the present embodiment viewed from a different direction from FIG. 7.
Figure 10:
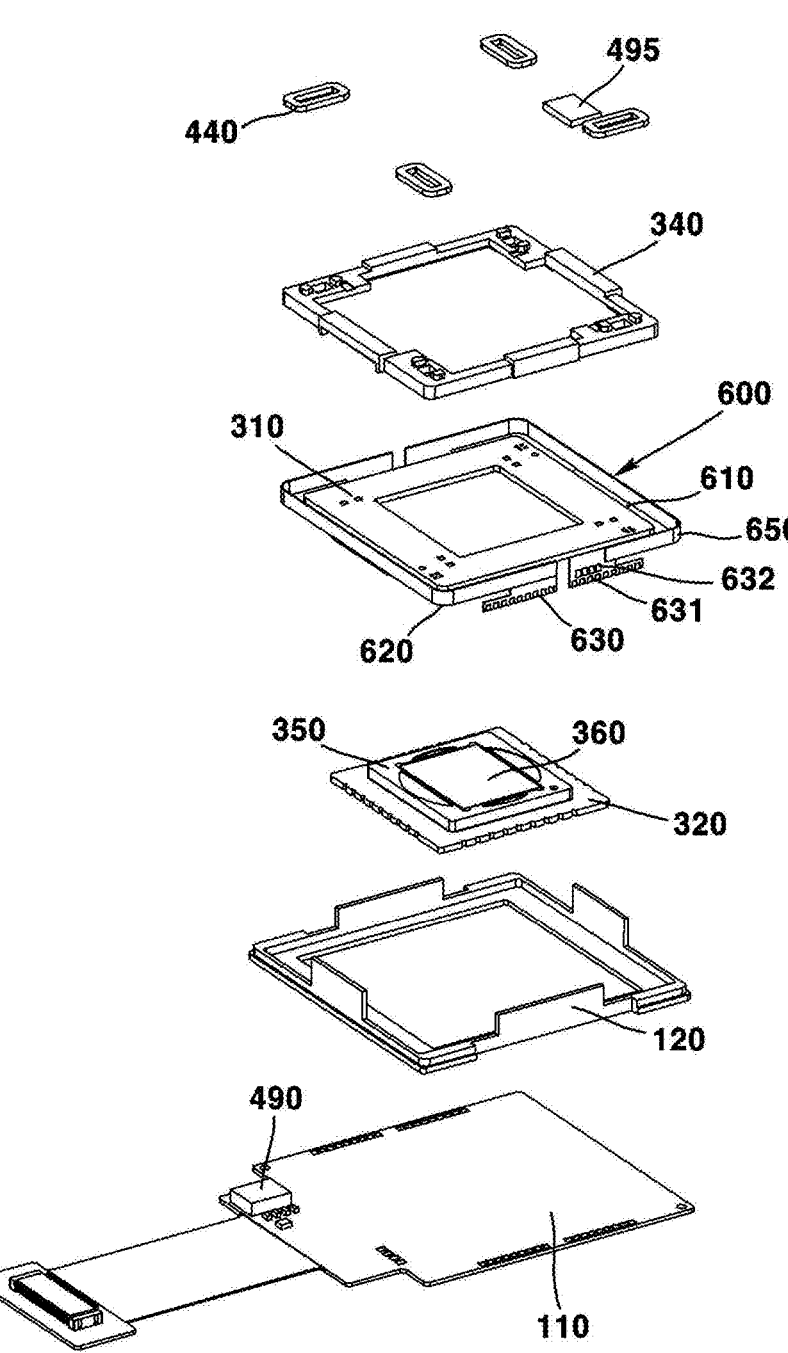
FIG. 10 is an exploded perspective view of a second moving part and related configuration of a camera device according to the present embodiment.
Figure 11:
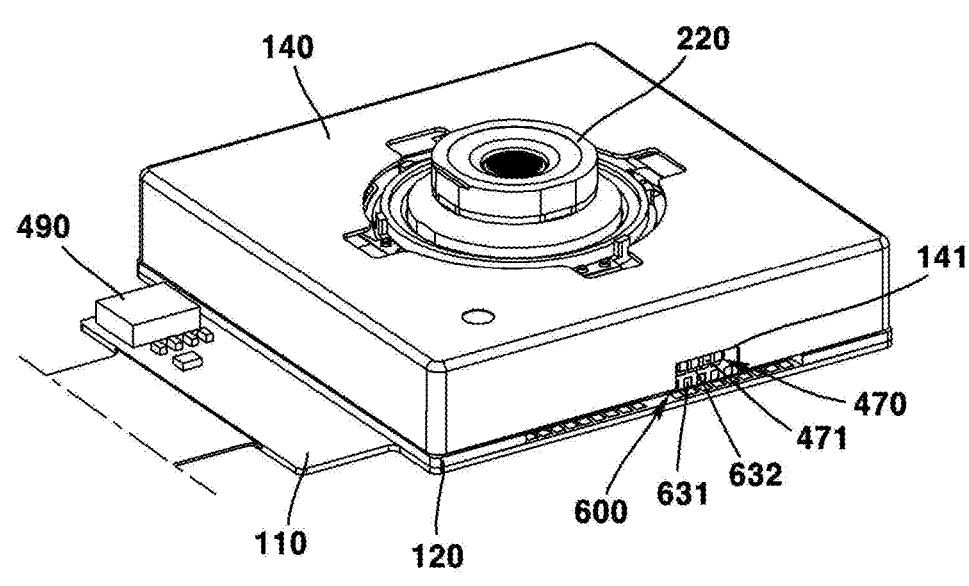
FIG. 11 is a perspective view of a camera device according to the present embodiment.
Figure 12A:
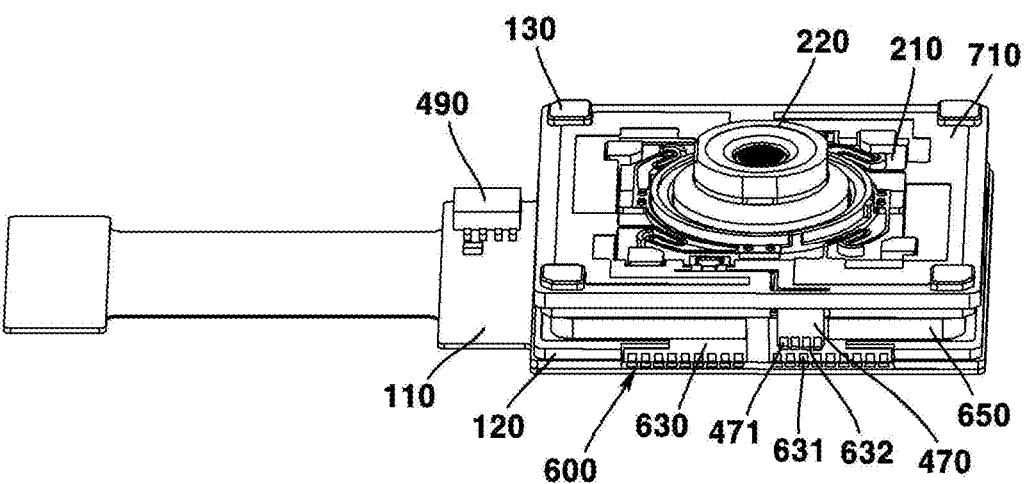
FIG. 12a is a perspective view of a state in which a cover member is omitted from a camera device according to the present embodiment.
Figure 12B:
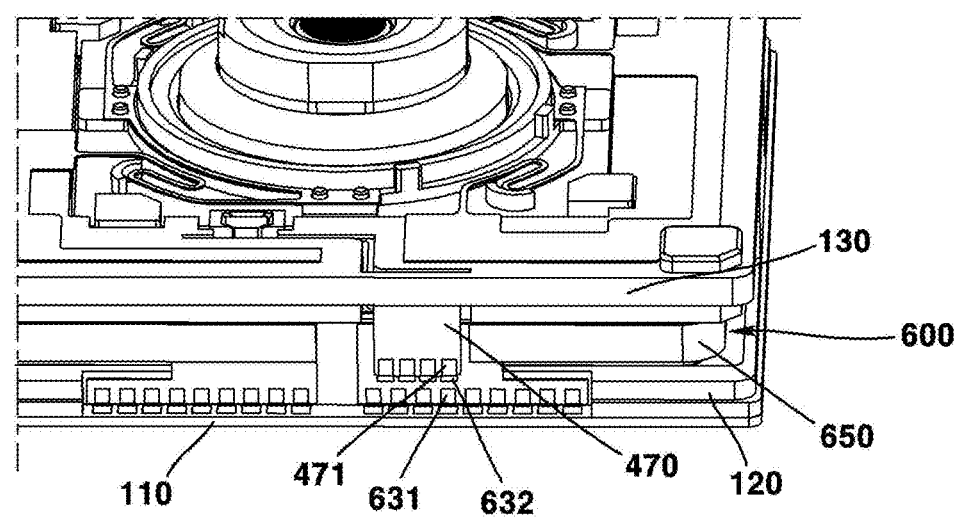
Figure 12C:
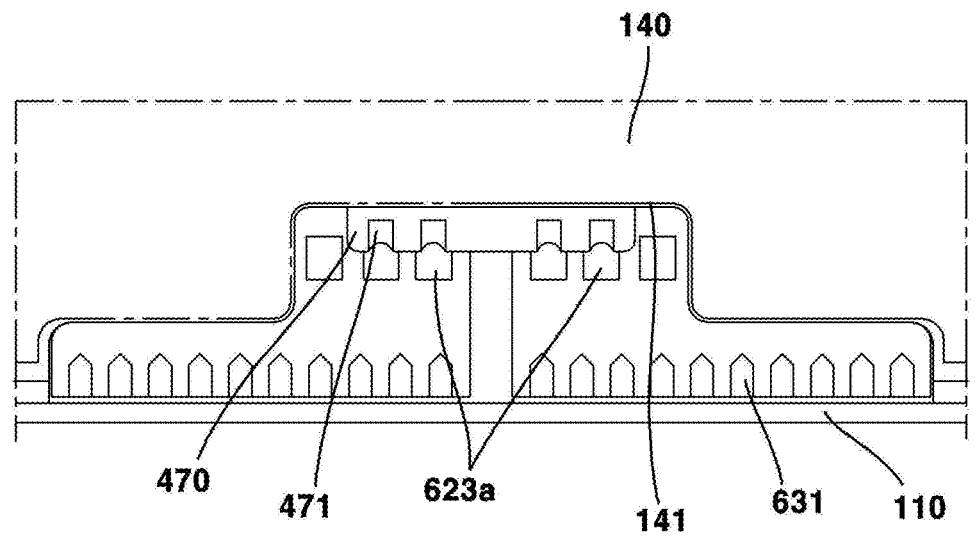
FIG. 12c is a diagram showing a coupling portion of a sensing substrate and a connection substrate of a camera device according to a modified embodiment.
Figure 13:
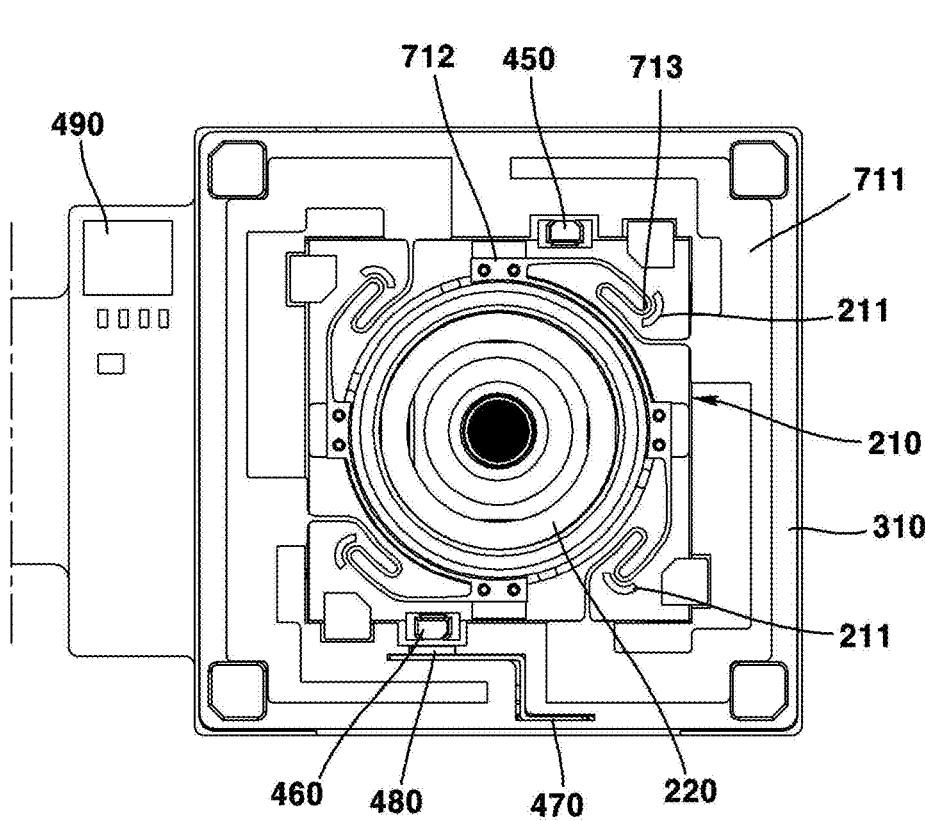
FIG. 13 is a plan view of a state in which z cover member is omitted from z camera device according to the present embodiment.
Figure 14:
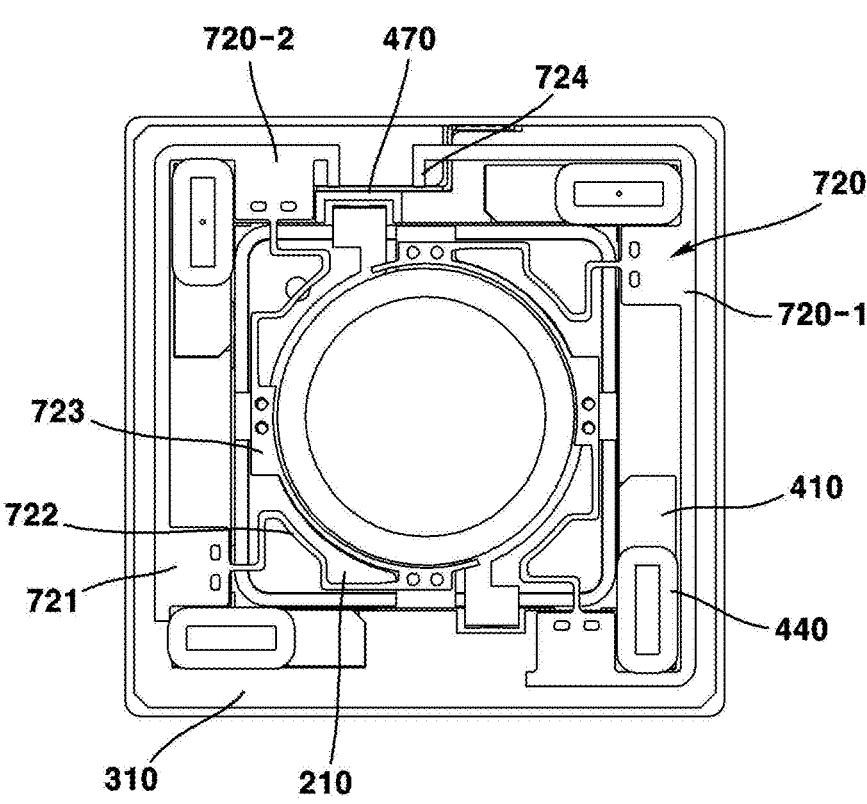
FIG. 14 is a bottom view of the first moving part and related configuration of z camera device according to the present embodiment.
Figure 15:
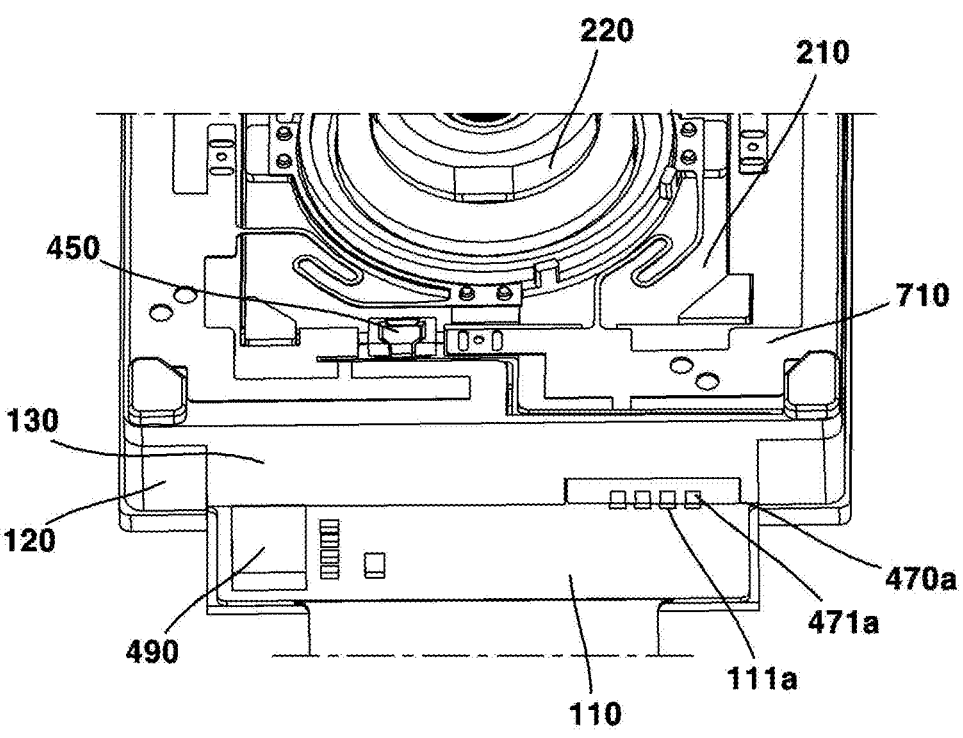
FIG. 15 is a perspective view of a state in which z cover member is omitted from z camera device according to the modified embodiment.
Figure 16:
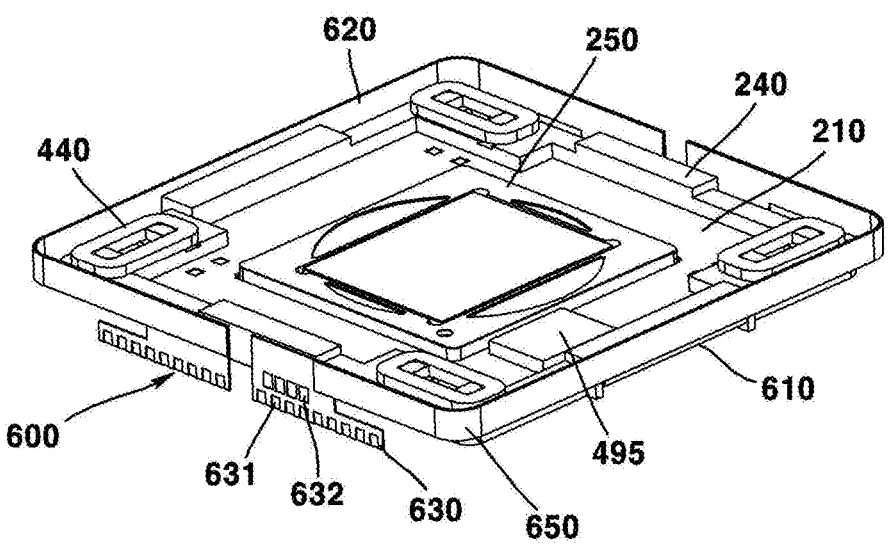
FIG. 16 is a perspective view of a second moving part and a connection substrate of a camera device according to the present embodiment.
Figure 17:
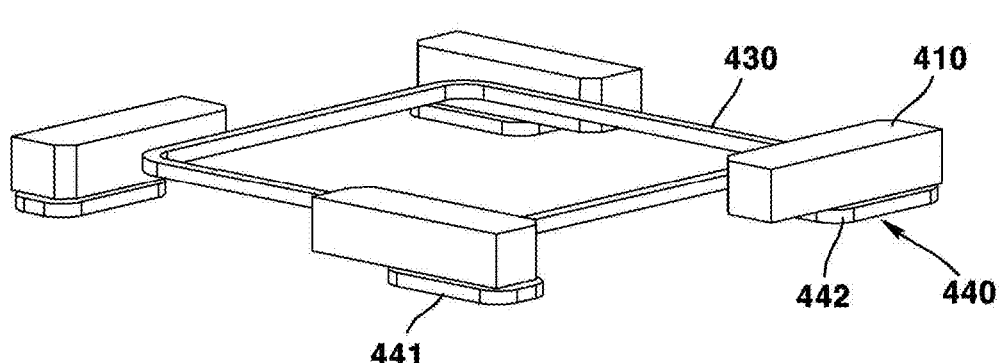
FIG. 17 is a perspective view illustrating a driving magnet and a driving coil of a camera device according to the present embodiment.

FIG. 1 is a perspective view of a camera device according to the present embodiment; FIG. 2 is a perspective view of a state in which the cover member is omitted from the camera device according to the present embodiment; FIG. 3 is a plan view of a camera device according to the present embodiment; FIG. 4 is a cross-sectional view taken along line A-A of FIG. 3; FIG. 5 is a cross-sectional view taken along line B-B of FIG. 3; FIG. 6 is a cross-sectional view taken along line C-C of FIG. 3; FIG. 7 is an exploded perspective view of a camera device according to the present embodiment; FIG. 8 is an exploded perspective view of a camera device according to the present embodiment viewed from a different direction from FIG. 7; FIG. 9 is an exploded perspective view of a first moving part and related configuration of a camera device according to the present embodiment; FIG. 10 is an exploded perspective view of a second moving part and related configuration of a camera device according to the present embodiment; FIG. 11 is a perspective view of a camera device according to the present embodiment; FIG. 12a is a perspective view of a state in which a cover member is omitted from a camera device according to the present embodiment; FIG. 12b is a partially enlarged view of FIG. 12a; FIG. 12c is a diagram showing a coupling portion of a sensing substrate and a connection substrate of a camera device according to a modified embodiment; FIG. 13 is a plan view of a state in which z cover member is omitted from z camera device according to the present embodiment; FIG. 14 is a bottom view of the first moving part and related configuration of z camera device according to the present embodiment; FIG. 15 is a perspective view of a state in which z cover member is omitted from z camera device according to the modified embodiment; FIG. 16 is a perspective view of a second moving part and a connection substrate of a camera device according to the present embodiment; FIG. 17 is a perspective view illustrating a driving magnet and a driving coil of a camera device according to the present embodiment; and FIG. 18 is a cross-sectional view of a camera device according to the present embodiment. The wire of the camera device according to the present embodiment may be omitted in drawings other than FIG. 18. However, the wire may be illustrated and described in FIG. 18 as one configuration of a camera device according to the present embodiment.

The camera device 10 may photograph any one or more of an image and a video. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an auto focus assembly. The camera device 10 may comprise a handshake correction assembly. The camera device 10 may comprise an autofocus device. The camera device 10 may comprise a handshake correction device. The camera device 10 may comprise an actuator. The camera device 10 may comprise a lens driving actuator. The camera device 10 may comprise a sensor driven actuator. The camera device 10 may comprise an auto focus actuator. The camera device 10 may comprise a handshake correction actuator.

The camera device 10 may comprise a fixed part 100. The fixed part 100 may be a relatively fixed portion when the moving parts 200 and 300 move. The fixed part 100 may be a relatively fixed portion when one or more of a first moving part 200 and the second moving part 300 moves. The fixed part 100 may accommodate the first moving part 200 and the second moving part 300. The fixed part 100 may be disposed at an outer side of the first moving part 200 and the second moving part 300.

Although the first substrate 110 has been described as one configuration of the fixed part 100 throughout the specification, the first substrate 110 may be understood as a separate configuration from the fixed part 100. The fixed part 100 may be disposed in the first substrate 110. The fixed part 100 may be disposed on the first substrate 110. The fixed part 100 may be disposed above the first substrate 110.

The camera device 10 may comprise a first substrate 110. The fixed part 100 may comprise a first substrate 110. The first substrate 110 may be a main substrate. The first substrate 110 may be a substrate. The first substrate 110 may be a printed circuit board (PCB). The first substrate 110 may be connected to a power source of the optical device 1. The first substrate 110 may comprise a connector connected to a power source of the optical device 1.

The camera device 10 may comprise a base 120. The fixed part 100 may comprise a base 120. The base 120 may be disposed in the first substrate 110. The base 120 may be disposed on the first substrate 110. The base 120 may be disposed above the first substrate 110. The base 120 may be fixed to the first substrate 110. The base 120 may be coupled to the first substrate 110. The base 120 may be attached to the first substrate 110 by an adhesive. The base 120 may be disposed between the first substrate 110 and a housing 130.

The camera device 10 may comprise a housing 130. The fixed part 100 may comprise a housing 130. The housing 130 may be disposed in the base 120. The housing 130 may be disposed on the base 120. The housing 130 may be disposed above the base 120. The housing 130 may be fixed to the base 120. The housing 130 may be coupled to the base 120. The housing 130 may be attached to the base 120 by an adhesive. The housing 130 may be disposed on the first substrate 110. The housing 130 may be disposed above the first substrate 110. The housing 130 may be formed of a member separate from the base 120.

The housing 130 may comprise a hole 131. The hole 131 may be a sensing substrate accommodating hole. The hole 131 may be formed in a shape corresponding to the sensing substrate 470. The hole 131 may be recessed in a shape corresponding to the sensing substrate 470. At least a portion of the hole 131 may be formed in a shape corresponding to the sensing substrate 470. The sensing substrate 470 may be disposed in the hole 131. The hole 131 may accommodate at least a portion of the sensing substrate 470.

In a modified embodiment, the hole 131 may be formed as a groove. The housing 130 may comprise a sensing substrate accommodating groove. The groove may be formed in a shape corresponding to the sensing substrate 470. The groove may be recessed in a shape corresponding to the sensing substrate 470. At least a portion of the groove may be formed in a shape corresponding to the sensing substrate 470. A sensing substrate 470 may be disposed in the groove. The groove may accommodate at least a portion of the sensing substrate 470.

The camera device 10 may comprise a cover member 140. The fixed part 100 may comprise a cover member 140. The cover member 140 may be coupled to the base 120. The cover member 140 may be coupled to the housing 130. The cover member 140 may be coupled to the first substrate 110. The cover member 140 may be fixed to the base 120. The cover member 140 may be fixed to the housing 130. The cover member 140 may be fixed to the first substrate 110. The cover member 140 may cover at least a portion of the base 120. The cover member 140 may cover at least a portion of the housing 130.

The cover member 140 may be a 'cover can' or a 'shield can'. The cover member 140 may be formed of a metal material. The cover member 140 may block electromagnetic interference (EMI). The cover member 140 may be electrically connected to the first substrate 110. The cover member 140 may be grounded to the first substrate 110.

The cover member 140 may comprise an upper plate. The cover member 140 may comprise a hole formed in the upper plate. The hole may be formed at a position corresponding to the lens 220. The cover member 140 may comprise a side plate. The side plate may comprise a plurality of side plates. The side plate may comprise four side plates. The side plate may comprise first to fourth side plates. The side plate may comprise first and second side plates being disposed opposite to each other, and third and fourth side plates being disposed opposite to each other. The cover member 140 may comprise a plurality of corners between the plurality of side plates.

The cover member 140 may comprise a groove 141. The groove 141 may be recessed from a lower end of the side plate of the cover member 140. The groove 141 may be formed in a lower end of the side plate of the cover member 140. The groove 141 may expose the first terminal 471 of the sensing substrate 470. The groove 141 may be disposed at a position corresponding to the first terminal 471 of the sensing substrate 470. The groove 141 may expose the first terminal 631 of the connection substrate 630. The groove 141 may expose a second terminal 632 of the connection substrate 630. The groove 141 may be a cutout portion. The first terminal 471 of the sensing substrate 470 may be soldered to the second terminal 632 of the connection substrate 630 through the groove 141. The AF assembly may be assembled to the OIS assembly in a state in which the cover member 140 is assembled by the groove 141. The AF assembly may comprise a first moving part 200 and related configurations. The OIS assembly may comprise a second moving part 300 and related configurations. In the present embodiment, a part of the cover member 140 in the portion corresponding to the first terminal 471 of the sensing substrate 470 may be escaped to inhibit a short circuit between the soldering part of the cover member 140 and the sensing substrate 470. The ground of the sensing substrate 470 may be electrically connected to the cover member 140.

Although the cover member 140 has been described as one configuration of the fixed part 100 throughout the specification, the cover member 140 may be understood as a configuration separate from the fixed part 100. The cover member 140 may be coupled to the fixed part 100. The cover member 140 may cover the first moving part 200.

The camera device 10 may comprise a first moving part 200. The first moving part 200 may move with respect to the fixed part 100. The first moving part 200 may move in an optical axis direction with respect to the fixed part 100. The first moving part 200 may be disposed inside the fixed part 100. The first moving part 200 may be movably disposed inside the fixed part 100. The first moving part 200 may be arranged to be movable in an optical axis direction in the fixed part 100. An auto focus (AF) function may be performed by moving the first moving part 200 in an optical axis direction with respect to the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed to be spaced apart from the first substrate 110. The bobbin 210 may be disposed inside the housing 130. The bobbin 210 may be disposed inside the housing 130. At least a portion of the bobbin 210 may be accommodated in the housing 130. The bobbin 210 may be movably disposed in the housing 130. The bobbin 210 may be movably disposed on the housing 130 in an optical axis direction. The bobbin 210 may be coupled to the lens 220. The bobbin 210 may comprise a hollow or a hole. The lens 220 may be disposed in a hollow or hole of the bobbin 210. The outer circumferential surface of the lens 220 may be coupled to the inner circumferential surface of the bobbin 210.

The bobbin 210 may comprise a protrusion 211. The protrusion 211 may be a damper protrusion. A damper may be disposed in the protrusion 211. The protrusion 211 may be formed on an upper surface of the bobbin 210. The protrusion 211 may be protruded upward from the bobbin 210. The protrusion 211 of the bobbin 210 may be disposed adjacent to the connection part 713 of the upper elastic member 710. The protrusion 211 may be formed to have a curvature corresponding to the connection part 713. The damper may connect the protrusion 211 of the bobbin 210 to the connection part 713 of the upper elastic member 710. The damper may be an AF damper. The AF damper may be applied between the upper elastic member 710 and the first moving part 200. As a modified embodiment, the AF damper may be applied between the first moving part 200 and the fixed part 100.

The camera device 10 may comprise a lens 220. The first moving part 200 may comprise a lens 220. The lens 220 may be coupled to the bobbin 210. The lens 220 may be fixed to the bobbin 210. The lens 220 may move integrally with the bobbin 210. The lens 220 may be screw-coupled to the bobbin 210. The lens 220 may be attached to the bobbin 210 by an adhesive. The lens 220 may be disposed at a position corresponding to an image sensor 330. The optical axis of the lens 220 may coincide with the optical axis of the image sensor 330. The optical axis may be the z-axis. The lens 220 may comprise a plurality of lenses. The lens 220 may comprise a 5 or 6 lenses.

The camera device 10 may comprise a lens module. The lens module may be coupled to the bobbin 210. The lens module may comprise a barrel and one or more lenses 220 being disposed inside the barrel.

The camera device 10 may comprise a second moving part 300. The second moving part 300 may move with respect to the fixed part 100. The second moving part 300 may move in a direction perpendicular to an optical axis direction with respect to the fixed part 100. The second moving part 300 may be disposed inside the fixed part 100. The second moving part 300 may be movably disposed inside the fixed part 100. The second moving part 300 may be movably disposed inside the fixed part 100 in a direction perpendicular to an optical axis direction. A handshake correction (OIS) function may be performed by moving the second moving part 300 in a direction perpendicular to an optical axis direction with respect to the fixed part 100. The second moving part 300 may be disposed between the first moving part 200 and the first substrate 110.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in a direction perpendicular to an optical axis direction and the optical axis direction. The second substrate 310 may move in a direction perpendicular to an optical axis direction. The second substrate 310 may be electrically connected to the image sensor 330. The second substrate 310 may move integrally with the image sensor 330. The second substrate 310 may comprise a hole. The image sensor 330 may be disposed in the hole of the second substrate 310.

The second substrate 310 may comprise a terminal 311. The terminal 311 may be disposed on a lower surface of the second substrate 310. The terminal 311 may be coupled to the terminal 321 of the sensor substrate 320. The second substrate 310 may be formed separately from the sensor substrate 320. The second substrate 310 may be formed separately from the sensor substrate 320 to be coupled thereto. The terminal 321 of the sensor substrate 320 may be soldered to the terminal 311 of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled to the image sensor 330. The sensor substrate 320 may be coupled to the second substrate 310.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 while being coupled with the image sensor 330 may be coupled below the second substrate 310.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and a sensor base 350. The image sensor 330 may be electrically connected to the second substrate 310. The image sensor 330 may move integrally with the second substrate 310.

Light passing through the lens 220 and the filter 360 may be incident to the image sensor 330 to form an image. The image sensor 330 may be electrically connected to the sensor substrate 320, the second substrate 310, and the first substrate 110. The image sensor 330 may comprise an effective image region. The image sensor 330 may convert light being irradiated to the effective image region into an electrical signal. The image sensor 330 may comprise any one or more among a charge coupled device (CCD), a metal oxide semi-conductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or a hole in which the image sensor 330 is disposed. A second coil 440 may be disposed in the holder 340. The holder 340 may comprise a protrusion on which the second coil 440 is wound. The holder 340 may comprise a hole in which the Hall sensor 445 is disposed.

The camera device 10 may comprise a sensor base 350. The second moving part 300 may comprise a sensor base 350. The sensor base 350 may be disposed in the sensor substrate 320. The sensor base 350 may comprise a hole formed at a position corresponding to the image sensor 330. The sensor base 350 may comprise a groove in which the filter 360 is disposed.

The camera device 10 may comprise a filter 360. The second moving part 300 may comprise a filter 360. The filter 360 may be disposed between the lens 220 and the image sensor 330. The filter 360 may be disposed in the sensor base 350. The filter 360 may block light of a specific frequency band from being incident on the image sensor 330 among the light passing through the lens 220. The filter 360 may comprise an infrared cut filter. The filter 360 may block infrared rays from being incident on the image sensor 330.

The camera device 10 may comprise a driving unit. The driving unit may move the moving parts 200 and 300 with respect to the fixed part 100. The driving unit may perform an auto focus (AF) function. The driving unit may perform a handshake correction (OIS) function. The driving unit may move the lens 220. The driving unit may move the image sensor 330. The driving unit may comprise a magnet and a coil. The driving unit may comprise a shape memory alloy (SMA).

The camera device 10 may comprise a first driving unit. The first driving unit may be an AF driving unit. The first driving unit may move the first moving part 200 in an optical axis direction. The first driving unit may move the bobbin 210 in an optical axis direction. The lens 220 may be moved in an optical axis direction. The first driving unit may perform an auto focus (AF) function. The first driving unit may move the first moving part 200 in an upward direction of the optical axis direction. The first driving unit may move the first moving part 200 downward direction of the optical axis direction.

The camera device 10 may comprise a second driving unit. The second driving unit may be an OIS driving unit. The second driving unit may move the second moving part 300 in a direction perpendicular to the optical axis direction. The second driving unit may move the second substrate 310 in a direction perpendicular to the optical axis direction. The second driving unit may move the sensor substrate 320 in a direction perpendicular to the optical axis direction. The second driving unit may move the image sensor 330 in a direction perpendicular to the optical axis direction. The second driving unit may move the holder 340 in a direction perpendicular to the optical axis direction. The second driving unit may move the sensor base 350 in a direction perpendicular to the optical axis direction. The second driving unit may move the filter 360 in a direction perpendicular to the optical axis direction. The second driving unit may perform a handshake correction (OIS) function.

The second driving unit may move the second moving part 300 in a first direction perpendicular to the optical axis direction. The second driving unit may move the second moving part 300 in a second direction perpendicular to the optical axis direction and the first direction. The second driving unit may rotate the second moving part 300 about the optical axis.

In the present embodiment, the first driving unit may comprise a first coil 430. The second driving unit may comprise a second coil 440. The first driving unit and the second driving unit may comprise a driving magnet 410 commonly used for interaction between the first coil 430 and the second coil 440. That is, the first driving unit and the second driving unit may comprise individually controlled coils and a common magnet.

The camera device 10 may comprise a driving magnet 410. The driving unit may comprise a driving magnet 410. The driving magnet 410 may be a magnet. The driving magnet 410 may be a permanent magnet. The driving magnet 410 may be a common magnet. The driving magnet 410 may be commonly used for autofocus (AF) and handshake correction (OIS).

The driving magnet 410 may be disposed in the fixed part 100. The driving magnet 410 may be fixed to the fixed part 100. The driving magnet 410 may be coupled to the fixed part 100. The driving magnet 410 may be attached to the fixed part 100 by an adhesive. The driving magnet 410 may be disposed in the housing 130. The driving magnet 410 may be fixed to the housing 130. The driving magnet 410 may be coupled to the housing 130. The driving magnet 410 may be attached to the housing 130 by an adhesive. The driving magnet 410 may be disposed at a corner of the housing 130. The driving magnet 410 may be disposed to be biased toward a corner of the housing 130.

The driving magnet 410 may be a two-pole magnetized magnet comprising one N-pole region and one S-pole region. As a modified embodiment, the driving magnet 410 may be a four-pole magnetized magnet comprising two N-pole regions and two S-pole regions.

The driving magnet 410 may comprise a plurality of magnets. The driving magnet 410 may comprise four magnets. The driving magnet 410 may comprise first to fourth magnets. The first to fourth magnets may be disposed symmetrically with respect to the optical axis. The first to fourth magnets may be formed to have the same size and shape as each other.

In a modified embodiment, the driving magnet 410 may comprise a first magnet being disposed at a position corresponding to the first coil 430 and a second magnet being disposed at a position corresponding to the second coil 440. At this time, the first magnet and the second magnet may be disposed in the fixed part 100, and the first coil 430 and the second coil 440 may be disposed in the moving parts 200 and 300. Or, the first magnet and the second magnet may be disposed in the moving parts 200 and 300, and the first coil 430 and the second coil 440 may be disposed in the fixed part 100.

The camera device 10 may comprise a first coil 430. The driving unit may comprise a first coil 430. The first coil 430 may be disposed in the first moving part 200. The first coil 430 may be fixed to the first moving part 200. The first coil 430 may be coupled to the first moving part 200. The first coil 430 may be attached to the first moving part 200 by an adhesive. The first coil 430 may be disposed in the bobbin 210. The first coil 430 may be fixed to the bobbin 210. The first coil 430 may be coupled to the bobbin 210. The first coil 430 may be attached to the bobbin 210 by an adhesive. The first coil 430 may be electrically connected to a driver IC 480. The first coil 430 may be electrically connected to a lower elastic member 720, a sensing substrate 470, and the driver IC 480. The first coil 430 may receive current from the driver IC 480.

The first coil 430 may be disposed at a position corresponding to the driving magnet 410. The first coil 430 may be disposed in the bobbin 210 at a position corresponding to the driving magnet 410. The first coil 430 may face the driving magnet 410. The first coil 430 may comprise a surface facing the driving magnet 410. The first coil 430 may be disposed adjacent to the driving magnet 410. The first coil 430 may interact with the driving magnet 410. The first coil 430 may electromagnetically interact with the driving magnet 410.

The first coil 430 may move the first moving part 200 in an optical axis direction. The first coil 430 may move the bobbin 210 in an optical axis direction. The first coil 430 may move the lens 220 in an optical axis direction. The first coil 430 may move the first moving part 200 in an upward direction of the optical axis direction. The first coil 430 may move the bobbin 210 in an upward direction of the optical axis direction. The first coil 430 may move the lens 220 in an upward direction of the optical axis direction. The first coil 430 may move the first moving part 200 in a downward direction of the optical axis direction. The first coil 430 may move the bobbin 210 in a downward direction of the optical axis direction. The first coil 430 may move the lens 220 in a downward direction of the optical axis direction.

The camera device 10 may comprise a second coil 440. The driving unit may comprise a second coil 440. The second coil 440 may be disposed in the second moving part 300. The second coil 440 may be fixed to the second moving part 300. The second coil 440 may be coupled to the second moving part 300. The second coil 440 may be attached to the second moving part 300 by an adhesive. The second coil 440 may be disposed in the holder 340. The second coil 440 may be fixed to the holder 340. The second coil 440 may be coupled to the holder 340. The second coil 440 may be attached to the holder 340 by an adhesive. The second coil 440 may be wound around the protrusion of the holder 340 and disposed. The second coil 440 may be disposed on the holder 340. The second coil 440 may be electrically connected to the second substrate 310. Both ends of the second coil 440 may be soldered to the second substrate 310. The second coil 440 may be electrically connected to the driver IC 495. The second coil 440 may be electrically connected to the second substrate 310 and the driver IC 495. The second coil 440 may receive current from the driver IC 495.

The second coil 440 may be disposed at a position corresponding to the driving magnet 410. The second coil 440 may be disposed at a position corresponding to the driving magnet 410 in the holder 340. The second coil 440 may face the driving magnet 410. The second coil 440 may comprise a surface facing the driving magnet 410. The second coil 440 may be disposed adjacent to the driving magnet 410. The second coil 440 may interact with the driving magnet 410. The second coil 440 may electromagnetically interact with the driving magnet 410.

The second coil 440 may move the second moving part 300 in a direction perpendicular to the optical axis direction. The second coil 440 may move the second substrate 310 in a direction perpendicular to the optical axis direction. The second coil 440 may move the sensor substrate 320 in a direction perpendicular to the optical axis direction. The second coil 440 may move the image sensor 330 in a direction perpendicular to the optical axis direction. The second coil 440 may move the holder 340 in a direction perpendicular to the optical axis direction. The second coil 440 may rotate the second moving part 300 about an optical axis. The second coil 440 may rotate the second substrate 310 about an optical axis. The second coil 440 may rotate the sensor substrate 320 about an optical axis. The second coil 440 may rotate the image sensor 330 about an optical axis. The second coil 440 may rotate the holder 340 about an optical axis.

The second coil 440 may comprise a plurality of coils. The second coil 440 may comprise four coils. The second coil 440 may comprise a coil for shift in x-axis. The second coil 440 may comprise a coil for shift in y-axis.

The second coil 440 may comprise a second-first coil 441. The second-first coil 441 may be a first sub-coil. The second-first coil 441 may be a coil for x-axis shift. The second-first coil 441 may move the second moving part 300 in the x-axis direction. The second-first coil 441 may be disposed in length along the y-axis. The second-first coil 441 may comprise a plurality of coils. The second-first coil 441 may comprise two coils. The two coils of the second-first coil 441 may be electrically connected to each other. The second-first coil 441 may comprise a connection coil connecting the two coils. In this case, the two coils of the second-first coil 441 may receive current together. Or, the two coils of the second-first coil 441 may be electrically separated from each other to receive current individually The second coil 440 may comprise a second-second coil 442. The second-second coil 442 may be a second sub-coil. The second-second coil 442 may be a coil for y-axis shift. The second-second coil 442 may move the second moving part 300 in the y-axis direction. The second-second coil 442 may be disposed in length along the x-axis. The second-first coil 441 may comprise a plurality of coils. The second-second coil 442 may comprise two coils. Two coils of the second-second coil 442 may be electrically connected to each other. The second-second coil 442 may comprise a connection coil connecting the two coils. In this case, the two coils of the second-second coil 442 may receive current together. Or, the two coils of the second-second coil 442 may be electrically separated from each other to receive current individually.

The camera device 10 may comprise a Hall sensor 445. The Hall sensor 445 may be disposed in the second substrate 310. The Hall sensor 445 may be disposed in a hole of the holder 340. The Hall sensor 445 may comprise a Hall device (Hall IC). The Hall sensor 445 may detect the driving magnet 410. The Hall sensor 445 may detect a magnetic force of the driving magnet 410. The Hall sensor 445 may face the driving magnet 410. The Hall sensor 445 may be disposed at a position corresponding to the driving magnet 410. The Hall sensor 445 may be disposed adjacent to the driving magnet 410. The Hall sensor 445 may detect the position of the second moving part 300. The Hall sensor 445 may detect the movement of the second moving part 300. The Hall sensor 445 may be disposed in the hollow of the second coil 440. The sensed value detected by the Hall sensor 445 may be used to feedback the handshake correction operation. The Hall sensor 445 may be electrically connected to the driver IC 495.

The Hall sensor 445 may comprise a plurality of Hall sensors. The Hall sensor 445 may comprise three Hall sensors. The Hall sensor 445 may comprise first to third Hall sensors. The first Hall sensor may detect the displacement of the second moving part 300 in the x-axis direction. The second Hall sensor may detect the displacement of the second moving part 300 in the y-axis direction. The third Hall sensor may detect the rotation of the second moving part 300 about the z-axis alone or together with any one or more of the first Hall sensor and the second Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be adhered to the first moving part 200 by an adhesive. The sensing magnet 450 may be disposed in the bobbin 210. The sensing magnet 450 may be fixed to the bobbin 210. The sensing magnet 450 may be coupled to the bobbin 210. The sensing magnet 450 may be attached to the bobbin 210 by an adhesive. The sensing magnet 450 may be formed to have a smaller size than the driving magnet 410. Through this, the influence of the sensing magnet 450 on driving may be minimized.

The sensing magnet 450 may be disposed opposite to a correction magnet 460. The sensing magnet 450 and the correction magnet 460 may be disposed opposite to each other in the first moving part 200. The sensing magnet 450 and the correction magnet 460 may be disposed opposite to each other in the bobbin 210.

The camera device 10 may comprise a correction magnet 460. The correction magnet 460 may be a compensation magnet. The correction magnet 460 may be disposed in the first moving part 200. The correction magnet 460 may be fixed to the first moving part 200. The correction magnet 460 may be coupled to the first moving part 200. The correction magnet 460 may be attached to the first moving part 200 by an adhesive. The correction magnet 460 may be disposed in the bobbin 210. The correction magnet 460 may be fixed to the bobbin 210. The correction magnet 460 may be coupled to the bobbin 210. The correction magnet 460 may be attached to the bobbin 210 by an adhesive. The correction magnet 460 may be formed to have a size smaller than that of the driving magnet 410. Through this, the influence of the correction magnet 460 on driving can be minimized. In addition, the correction magnet 460 may be disposed on the opposite side of the sensing magnet 450 to form a magnetic force balance with the sensing magnet 450. Through this, the tilt that may be generated by the sensing magnet 450 can be inhibited.

The camera device 10 may comprise a sensing substrate 470. The sensing substrate 470 may be a substrate. The sensing substrate 470 may be a printed circuit board (PCB). The sensing substrate 470 may be a flexible substrate. The sensing substrate 470 may be an FPCB. The sensing substrate 470 may be coupled to the first substrate 110. The sensing substrate 470 may be connected to the first substrate 110. The sensing substrate 470 may be electrically connected to the first substrate 110. The sensing substrate 470 may be soldered to the first substrate 110. The sensing substrate 470 may be disposed in the housing 130. The sensing substrate 470 may be fixed to the housing 130. The sensing substrate 470 may be coupled to the housing 130. The housing 130 may comprise a groove or hole having a shape corresponding to that of the sensing substrate 470. The sensing substrate 470 may be disposed in a groove or hole of the housing 130. The sensing substrate 470 may be bent at least twice in a direction perpendicular to the optical axis direction.

The sensing substrate 470 may also be referred to as a third substrate, a fourth substrate, or the like, similar to the first substrate 110 and the second substrate 310.

In the present embodiment, the sensing substrate 470 may be spaced apart from the first substrate 110. At this time, the sensing substrate 470 may be electrically connected to the first substrate 110 through the connection substrate 600. That is, the sensing substrate 470 and the first substrate 110 may be indirectly connected through the connection substrate 600 without being physically contacted or directly coupled. The sensing substrate 470 may be coupled to the connection substrate 600. The sensing substrate 470 may be coupled to the terminal part 630 of the connection substrate 600. The sensing substrate 470 may be fixed to the connection substrate 600. The sensing substrate 470 may be fixed to the terminal part 630 of the connection substrate 600. The sensing substrate 470 may be disposed in the connection substrate 600. The sensing substrate 470 may be disposed in the terminal part 630 of the connection substrate 600. The sensing substrate 470 may be coupled to the connection substrate 600 by a solder. The sensing substrate 470 may be coupled to the terminal part 630 of the connection substrate 600 by soldering.

The sensing substrate 470 may be overlapped with the connection substrate 600 in a direction perpendicular to the optical axis direction. In a direction perpendicular to the optical axis direction, the sensing substrate 470 may be overlapped with the height of the connection substrate 600 and the maximum point of the connection substrate 600 by 40% to 70%. In a direction perpendicular to the optical axis direction, the sensing substrate 470 may be overlapped with the terminal part 630 of the connection substrate 600. The sensing substrate 470 is spaced apart from the lower end of the connection substrate 600, and can be soldered to the connection substrate 600. The sensing substrate 470 may be soldered to the second terminal 632 of the connection substrate 600. The sensing substrate 470 may comprise a first terminal 471. The first terminal 471 may be connected to the second terminal 632 of the connection substrate 600. The solder connecting the sensing substrate 470 and the connection substrate 600 may be disposed closer to the first substrate 110 than the driver IC 480.

The sensing substrate 470 may be overlapped with the metal plate 650 in a direction perpendicular to the optical axis direction. The sensing substrate 470 may be soldered to the connection substrate 600 below the metal plate 650. The sensing substrate 470 may be disposed to be biased toward the opposite side of the connector of the first substrate 471 when viewed from the side.

The first terminal 471 may comprise a plurality of terminals. The first terminal 471 may comprise four first terminals 471. The four first terminals 471 may be respectively coupled to the four second terminals 632 of the connection substrate 600. The four first terminals 471 may comprise an SDA terminal, an SCL terminal, a Vcc terminal, and a Vdd terminal. The first terminal 471 may comprise a terminal for I2C communication. In the present embodiment, the power terminal of the first substrate 110 and the I2C communication terminal can be used in common. The cover member 140 may be electrically connected to the sensing substrate 470 or the ground pad of the first substrate 110.

As a modified embodiment, a Hall device may be disposed at a location of the driver IC 480. At this time, a control unit for applying a current to the first coil 430 may be disposed on the first substrate 110. At this time, the first terminal of the sensing substrate 470 may comprise six terminals. The 6 terminals may comprise (+) terminal of the first coil, the (−) terminal of the first coil, (+) terminal of the Hall input, (−) terminal of the Hall input, (+) terminal of the Hall output, and (−) terminal of the Hall output.

The sensing substrate 470 may comprise a second terminal 472. It can be connected with two lower elastic members 720. The two lower elastic members 720 may be connected to the first coil 430. That is, the lower elastic member 720 may connect the second terminal 472 and the first coil 430 of the sensing substrate 470. The lower elastic member 720 may electrically connect the second terminal 472 and the first coil 430 of the sensing substrate 470.

As illustrated in FIG. 15, in a modified embodiment, the camera device 10 may comprise a sensing substrate 470a. The sensing substrate 470a may be coupled to the first substrate 110. The sensing substrate 470a may be directly coupled to the first substrate 110. The sensing substrate 470a may be coupled to the first substrate 110 by a solder. The sensing substrate 470a may be bonded to the first substrate 110 by a conductive epoxy. The sensing substrate 470a may be fixed to the first substrate 110. The sensing substrate 470a may be disposed in the first substrate 110. The sensing substrate 470a may be coupled to the first terminal 471a of the first substrate 110. The sensing substrate 470a may be coupled to the first terminal 471a of the first substrate 110 by a solder. The sensing substrate 470a may be coupled to the first terminal 471a of the first substrate 110 by conductive epoxy. In a modified embodiment, the housing 130 may comprise a groove for opening a portion where the terminal of the first substrate 110 and the first terminal 471a of the first substrate 110 are coupled.

In a modified embodiment, the upper elastic member 710 may comprise two upper elastic members that are spaced apart from each other. The upper elastic member 710 may connect the second terminal 472 and the first coil 430 of the sensing substrate 470. The upper elastic member 710 may electrically connect the second terminal 472 and the first coil 430 of the sensing substrate 470.

The camera device 10 may comprise a driver IC 480. The driver IC 480 may be an AF driver IC. The driver IC 480 may be electrically connected to the first coil 430. The driver IC 480 may apply a current to the first coil 430 to perform AF driving. The driver IC 480 may apply a power source to the first coil 430. The driver IC 480 may apply a current to the first coil 430. The driver IC 480 may apply a voltage to the first coil 430. The driver IC 480 may be disposed in the sensing substrate 470. The driver IC 480 may be disposed at a position corresponding to the sensing magnet 450. The driver IC 480 may be disposed to face the sensing magnet 450. The driver IC 480 may be disposed adjacent to the sensing magnet 450.

The driver IC 480 may comprise a sensor. The sensor may comprise a Hall IC. The sensor may be disposed at a position corresponding to the sensing magnet 450. The sensor may be disposed to face the sensing magnet 450. The sensor may be disposed adjacent to the sensing magnet 450. The sensor may detect the sensing magnet 450. The sensor may detect the magnetic force of the sensing magnet 450. The sensor may detect the position of the first moving part 200. The sensor may detect the movement of the first moving part 200. The detected value detected by the sensor may be used for feedback of autofocus driving.

The camera device 10 may comprise a gyro sensor 490. The gyro sensor 490 may be disposed in the first substrate 110. The gyro sensor 490 may detect the shaking of the camera device 10. The gyro sensor 490 may detect an angular velocity or a linear velocity caused by shaking of the camera device 10. The gyro sensor 490 may be electrically connected to the driver IC 495. The shaking of the camera device 10 detected by the gyro sensor 490 may be used to drive a handshake correction (OIS).

The camera device 10 may comprise a driver IC 495. The driver IC 495 may be an OIS driver IC. The driver IC 495 may be electrically connected to the second coil 440. The driver IC 495 may apply a current to the second coil 440 to perform OIS driving. The driver IC 495 may apply a power source to the second coil 440. The driver IC 495 may apply a current to the second coil 440. The driver IC 495 may apply a voltage to the second coil 440. The driver IC 495 may be disposed in the second substrate 310.

The camera device 10 may comprise a connection member. The connection member may be an interposer. The connection member may support the movement of the second moving part 300. The connection member may movably support the second moving part 300. The connection member may connect the second moving part 300 and the fixed part 100. The connection member may connect the first substrate 110 and the second substrate 310. The connection member may electrically connect the first substrate 110 and the second substrate 310. The connection member may guide the movement of the second moving part 300. The connection member may guide the second moving part 300 to move in a direction perpendicular to the optical axis direction. The connection member may guide the second moving part 300 to rotate about the optical axis. The connection member may limit the movement of the second moving part 300 in an optical axis direction.

The connection member may comprise a connection substrate 600. The connection member may comprise an elastic member for connecting the fixed part 100 and the second moving part 300. The connection member may comprise a leaf spring. The connection member may comprise a wire 800. The connection member may comprise a ball disposed between the fixed part 100 and the second moving part 300.

The camera device 10 may comprise a connection substrate 600. The connection substrate 600 may be a connection part. The connection substrate 600 may be a connection member. The connection substrate 600 may be a stretchable substrate. The connection substrate 600 may be a flexible substrate. The connection substrate 600 may be a flexible printed circuit board. The connection substrate 600 may be a flexible printed circuit board (FPCB). The connection substrate 600 may have flexibility in at least a part. The second substrate 310 and the connection substrate 600 may be integrally formed.

The connection substrate 600 may support the second moving part 300. The connection substrate 600 may support the movement of the second moving part 300. The connection substrate 600 may movably support the second moving part 300. The connection substrate 600 may connect the second moving part 300 and the fixed part 100. The connection substrate 600 may connect the first substrate 110 and the second substrate 310. The connection substrate 600 may electrically connect the first substrate 110 and the second substrate 310. The connection substrate 600 may guide the movement of the second moving part 300. The connection substrate 600 may guide the second moving part 300 to move in a direction perpendicular to the optical axis direction. The connection substrate 600 may guide the second moving part 300 to rotate about the optical axis. The connection substrate 600 may limit the movement of the second moving part 300 in an optical axis direction. A portion of the connection substrate 600 may be coupled to the base 120.

The connection substrate 600 may comprise two connection substrates 600 spaced apart from each other and formed symmetrically. As shown in FIG. 14, two connection substrates 600 may be disposed at both sides of the second substrate 310. The connection substrate 600 connected as shown in FIG. 14 may be bent a total of 6 times to connect the first substrate 110 and the second substrate 310 as shown in FIG. 15.

The connection substrate 600 may comprise a first region connected to the second substrate 310 and being bent in an optical axis direction. The first region is connected to the second substrate 310 and may be bent in an optical axis direction. The first region is connected to the second substrate 310 and may be extended in an optical axis direction. The first region may be connected to the second substrate 310 and extended by being bent in an optical axis direction. The connection substrate 600 may comprise a second region being extended from the first region. The connection substrate 600 may comprise a third region that is bent in a direction perpendicular to the optical axis direction in the second region. The third region may be bent in a direction perpendicular to the optical axis direction in the second region. The third region may be extended in a direction perpendicular to the optical axis direction in the second region. The third region may be bent and extended in a direction perpendicular to the optical axis direction in the second region.

The connection substrate 600 may comprise a first bending region that is bent in an optical axis direction. The connection substrate 600 may comprise a first bending region bent in an optical axis direction. The connection substrate 600 may comprise a first bending region being extended in an optical axis direction. The extension part 620 of the connection substrate 600 may comprise a second bending region that is bent in a direction perpendicular to the optical axis direction. The extension part 620 may comprise a second bending region being bent in a direction perpendicular to the optical axis direction. The extension part 620 may comprise a second bending region being extended in a direction perpendicular to the optical axis direction. The extension part 620 may comprise a second bending region being bent and extended in a direction perpendicular to the optical axis direction.

The connection substrate 600 may comprise a connection part 610 comprising a first region. The connection substrate 600 may comprise an extension part 620 comprising a second region and a third region. The connection substrate 600 may comprise a connection part 610 being connected to the second substrate 310. The connection substrate 600 may comprise an extension part 620 being extended from the connection part 610. The connection substrate 600 may comprise a terminal part 630 being connected to the extension part 620 and comprising a terminal.

The connection substrate 600 may comprise a connection part 610. The connection part 610 may be connected to the second moving part 300. The connection part 610 may be coupled to the second moving part 300. The connection part 610 may be fixed to the second moving part 300. The connection part 610 may be connected to the second substrate 310. The connection part 610 may be coupled to the second substrate 310. The connection part 610 may be fixed to the second substrate 310. The connection part 610 may comprise a first bending region that is bent in an optical axis direction. The connection part 610 may comprise a first bending region being cut and bent in the optical axis direction. The connection part 610 may comprise a first bending region being extended in an optical axis direction. The connection part 610 may comprise a first region that is bent in an optical axis direction with respect to the second substrate 310 and a second region being extended from the first region and bent in a direction perpendicular to the optical axis direction.

The connection substrate 600 may comprise an extension part 620. The extension part 620 may connect the connection part 610 and the terminal part 630. The extension part 620 may be extended from the connection part 610. The extension part 620 may comprise a second bending region that is bent in a direction perpendicular to the optical axis direction.

The connection substrate 600 may comprise a terminal part 630. The terminal part 630 may be coupled to the fixed part 100. The terminal part 630 may be fixed to the fixed part 100. The terminal part 630 may be coupled to the first substrate 110. The terminal part 630 may be connected to the first substrate 110. The terminal part 630 may be soldered to the first substrate 110. The terminal part 630 may be fixed to the first substrate 110. The terminal part 630 may be coupled to the base 120. The terminal part 630 may be fixed to the base 120. The terminal part 630 may comprise a terminal. The terminal may be coupled to the first substrate 110. The terminal part 630 may comprise a first portion having a first width and a second portion having a second width narrower than the first width. A first terminal 631 may be disposed on the first portion and a second terminal 632 may be disposed on the second portion. The second part may connect the first part and the extension part 620.

The terminal part 630 may comprise a first terminal 631. The first terminal 631 may be connected to the first substrate 110. The first terminal 631 may be disposed on an outer surface of the connection substrate 600. The first terminal 631 of the connection substrate 600 may be disposed on a lower end of the connection substrate 600. The first terminal 631 may be disposed in the terminal part 630. The first terminal 631 may be coupled to the first substrate 110. The first terminal 631 may be coupled to the terminal of the first substrate 110. The first terminal 631 may be coupled to the terminal of the first substrate 110 through a solder.

The terminal part 630 may comprise a second terminal 632. The second terminal 632 may be connected to the sensing substrate 470. The second terminal 632 may be disposed on an outer surface of the connection substrate 600. The second terminal 632 of the connection substrate 600 may be disposed to be spaced apart from the first terminal 631 on an outer surface of the connection substrate 600. The second terminal 632 of the connection substrate 600 may be disposed spaced apart from a lower end of the connection substrate 600. The second terminal 632 of the connection substrate 600 may be disposed in the first terminal 631 in an optical axis direction. The second terminal 632 may be disposed in the terminal part 630. The second terminal 632 may be coupled to the sensing substrate 470. The second terminal 632 may be coupled to the first terminal 471 of the sensing substrate 470. The second terminal 632 may be coupled to the first terminal 471 of the sensing substrate 470 through a solder.

The second terminal 632 may comprise a plurality of terminals. The second terminal 632 may comprise four second terminals 632. The four second terminals 632 may be respectively coupled to the four first terminals 471. The four second terminals 632 may comprise an SDA terminal, an SCL terminal, a Vcc terminal, and a Vdd terminal. The second terminal 632 may comprise a terminal for I2C communication.

As illustrated in FIG. 12_c_, in a modified embodiment, the connection substrate 600 may comprise a second terminal 632_a_. In the present embodiment, the second terminal 632 may be formed of four terminals on any one of the two unit connection substrates. However, in a modified embodiment, the second terminal 632_a_ may be formed as a total of six terminals, three on each of the two unit connection substrates. However, only 4 terminals out of 6 terminals can conduct electricity with the sensing substrate 470. The other two terminals may be a test terminal or a ground terminal.

In the present embodiment, the camera device 10 may comprise a flexible substrate. The flexible substrate may connect the fixed part 100 and the second moving part 300. The flexible substrate may comprise a connection part 610 being connected to the second moving part 300, an extension part 620 being extended from the connection part 610, and a terminal part 630 being connected to the extension part 620 and comprising a terminal.

In the present embodiment, the connection substrate 600 may comprise a first part being coupled to the first substrate 110, a second part being coupled to the second substrate 310, and a third part connecting the first part and the second part. The third part may be disposed parallel to an optical axis at least in part. The third part may be formed so that the length in an optical axis direction is longer than the thickness. The second part of the connection substrate 600 may be disposed parallel to the second substrate 310 at least in part. The third part of the connection substrate 600 may be disposed perpendicular to the second part at least in part. The third part of the connection substrate 600 may be bent roundly in the portion corresponding to the corner of the second substrate 310. The second substrate 310 may comprise a first side surface and a second side surface being disposed opposite to each other, and a third side surface and a fourth side surface being disposed opposite to each other. The second part of the connection substrate 600 may be coupled with the first side surface and the second side surface of the second substrate 310. The first part of the connection substrate 600 may be coupled to a portion of the first substrate 110 corresponding to the third side surface and the fourth side surface of the second substrate 310.

The camera device 10 may comprise a metal plate 650. The connection member may comprise a metal plate 650. The connection substrate 600 may comprise a metal plate 650. However, the metal plate 650 may be understood as a configuration separate from the connection substrate 600. The metal plate 650 may be a metal member. The metal plate 650 may be a metal part. The metal plate 650 may be a metal layer. The metal plate 650 may be a metal thin film. The metal plate 650 may be formed of metal. The metal plate 650 may be formed of an alloy. The metal plate 650 may be formed of a copper alloy. The metal plate 650 may be formed of a conductive material. The metal plate 650 may be distinguished from the conductive layer of the connection substrate 600. The metal plate 650 may be formed of a material different from the conductive layer of the connection substrate 600. The metal plate 650 may be coupled to the connection substrate 600. The metal plate 650 may have elasticity.

In an optical axis direction, at least in part, the length of the metal plate 650 may be the same as the length of the extension part 620. The metal plate 650 may be extended to have the same length as the extension part 620 in an optical axis direction. The thickness of the metal plate 650 may be the same as the thickness of the connection substrate 600. The thickness of the metal plate 650 may be thicker than the thickness of the connection substrate 600.

At least a portion of the metal plate 650 may be disposed in the extension part 620 of the connection substrate 600. The extension part 620 may comprise a bending region that is bent in a direction perpendicular to the optical axis direction. At this time, the metal plate 650 may be disposed in the bending region.

The metal plate 650 may be formed of a conductive material. The metal plate 650 may be used as a ground (GND). The metal plate 650 may be electrically connected to the first substrate 110. In this case, the number of power connection patterns of the connection substrate 600 may be reduced.

The camera device 10 may comprise an elastic member 700. The elastic member 700 may be a support member. The elastic member 700 may connect the fixed part 100 and the first moving part 200. The elastic member 700 may elastically connect the fixed part 100 and the first moving part 200. The elastic member 700 may connect the bobbin 210 and the housing 130. The elastic member 700 may elastically connect the bobbin 210 and the housing 130. The elastic member 700 may movably support the first moving part 200 with respect to the fixed part 100. The elastic member 700 may be deformed when the first moving part 200 moves. When the movement of the first moving part 200 is finished, the elastic member 700 may position the first moving part 200 to an initial position through a restoring force (elastic force). The elastic member 700 may comprise a leaf spring. The elastic member 700 may comprise a spring. The elastic member 700 may have elasticity at least in part. The elastic member 700 may provide a restoring force (elastic force) to the first moving part.

The camera device 10 may comprise an upper elastic member 710. The elastic member 700 may comprise an upper elastic member 710. The upper elastic member 710 may be disposed on the lower elastic member 720. The upper elastic member 710 may comprise an inner side portion coupled to the bobbin 210. The inner side portion of the upper elastic member 710 may be coupled to an upper portion of the bobbin 210. The inner side portion of the upper elastic member 710 may be disposed on an upper surface of the bobbin 210. The upper elastic member 710 may comprise an outer side portion coupled to the housing 130. The outer side portion of the upper elastic member 710 may be coupled to a lower portion of the housing 130. The outer side portion of the upper elastic member 710 may be disposed on a lower surface of the housing 130. The upper elastic member 710 may comprise a connection part connecting the inner side portion and the outer side portion. The connection part may have elasticity.

The camera device 10 may comprise a lower elastic member 720. The elastic member 700 may comprise a lower elastic member 720. The lower elastic member 720 may be disposed below the upper elastic member 710. The lower elastic member 720 may comprise an inner side portion being coupled to the bobbin 210. An inner side portion of the lower elastic member 720 may be coupled to a lower portion of the bobbin 210. An inner side portion of the lower elastic member 720 may be disposed on a lower surface of the bobbin 210. The lower elastic member 720 may comprise an outer side portion being coupled to the housing 130. An outer side portion of the lower elastic member 720 may be coupled to an upper portion of the housing 130. An outer side portion of the lower elastic member 720 may be disposed on an upper surface of the housing 130. The lower elastic member 720 may comprise a connection part connecting the inner side portion and the outer side portion. The connection part may have elasticity.

The lower elastic member 720 may comprise a plurality of lower portion elastic units. The lower elastic member 720 may comprise first and second lower portion elastic units 720-1 and 720-2. The lower elastic member 720 may comprise two lower portion elastic units 720-1 and 720-2. The two lower portion elastic units 720-1 and 720-2 are spaced apart from each other to electrically connect the sensing substrate 470 and the first coil 430.

The camera device 10 may comprise a wire 800. The wire 800 may be a wire spring. The wire 800 may be an elastic member. The wire 800 may be a leaf spring in a modified embodiment. The wire 800 may connect the fixed part 100 and the second moving part 300. The wire 800 may elastically connect the fixed part 100 and the second moving part 300. The wire 800 may connect the housing 130 and the second substrate 310. The wire 800 may elastically connect the housing 130 and the second substrate 310. The wire 800 may movably support the second moving part 300. The wire 800 may support the second moving part 300 to move or rotate in a direction perpendicular to the optical axis direction.

The camera device 10 according to the present embodiment may use a common magnet for AF and OIS driving. In the present embodiment, the VCM magnetic field structure for driving a total of 4 axes which are one axis for AF (Z-shift) and 3 axes of OIS (X-shift, Y-shift, Z-Roll) can be implemented with 4 magnets. In addition, in the present embodiment, through the FPCB bending structure, the electrical connection and the role of the spring can be performed together. In the present embodiment, it is possible to expect the effect of material cost reduction through reduction in the number of magnets to be adopted through the application of a common structure of driving magnets. In addition, in the present embodiment, it is possible to reduce the height dimension of the camera device 10 through the application of the common structure of driving magnets. In addition, in the present embodiment, it is possible to increase assembly and productivity by implementing a spring shape by bending the connection substrate 600 a total of 6 times.

Hereinafter, the operation of the camera device according to the present embodiment will be described with reference to the drawings.

FIG. 19 is a view for explaining the operation of the autofocus function of a camera device according to the present embodiment.

When a power source is applied to the first coil 430 of the camera device 10 according to the present embodiment, an electromagnetic field is formed in the first coil 430, and the first coil 430 may move in an optical axis direction (z-axis direction) through electromagnetic interaction with the driving magnet 410. At this time, the first coil 430 may move in an optical axis direction together with the first moving part 200 comprising the lens 220. In this case, since the lens 220 moves away from or closer to the image sensor 330, the focus of the subject may be adjusted. In order to apply a power source to the first coil 430, any one or more of a current and a voltage may be applied.

When a current in a first direction is applied to the first coil 430 of the camera device 10 according to the present embodiment, the first coil 430 moves in an upward direction of the optical axis direction through electromagnetic interaction with the driving magnet 410 (refer to a of FIG. 19). At this time, the first coil 430 may move the lens 220 in an upward direction of the optical axis direction to move it away from the image sensor 330.

When a current in a second direction opposite to the first direction is applied to the first coil 430 of the camera device 10 according to the present embodiment, The first coil 430 may move in a lower direction (refer to b of FIG. 19) of the optical axis direction through electromagnetic interaction with the driving magnet 410. At this time, the first coil 430 may move the lens 220 in a lower direction of the optical axis to be closer to the image sensor 330.

FIGS. 20 to 22 are diagrams for explaining the operation of the handshake correction function of a camera device according to the present embodiment.

When a power source is applied to the second coil 440 of the camera device 10 according to the present embodiment, an electromagnetic field is formed in the second coil 440 and the second coil 440 may move in a direction perpendicular to the optical axis direction through electromagnetic interaction with the driving magnet 410. In addition, the second coil 440 may rotate with respect to the optical axis through electromagnetic interaction with the driving magnet 410. At this time, the second coil 440 may move or rotate together with the second moving part 300 comprising the image sensor 330. In the present embodiment, the second coil 440 may move the image sensor 330 so that the shaking of the camera device 10 detected by the gyro sensor 490 is compensated.

FIG. 20 is a diagram for explaining driving in which the image sensor of the camera device according to the present embodiment is shifted along the x-axis.

When the current in a first direction is applied to the second-first coil 441 of the camera device 10 according to the present embodiment, the second-first coil 441 may move in one direction (refer to a of FIG. 20) of a first direction (x-axis direction) perpendicular to the optical axis direction through electromagnetic interaction with the driving magnet 410. At this time, the second-first coil 441 may move the image sensor 330 in one direction of a first direction perpendicular to the optical axis direction. Conversely, when a current in a second direction opposite to the first direction is applied to the second-first coil 441, the second-first coil 441 may move in the other direction of the first direction (x-axis direction) perpendicular to the optical axis direction through electromagnetic interaction with the driving magnet 410. At this time, the second-first coil 441 may move the image sensor 330 in the other of the first direction perpendicular to the optical axis direction.

FIG. 21 is a diagram for explaining driving in which an image sensor of a camera device according to the present embodiment is shifted along the y-axis.

When the current in a first direction is applied to the second-first coil 442 of the camera device 10 according to the present embodiment, the second-second coil 442 may move in one direction (refer to b of FIG. 21) of the first direction (y-axis direction) perpendicular to the optical axis direction through electromagnetic interaction with the driving magnet 410. At this time, the second-second coil 442 may move the image sensor 330 in one of the second directions perpendicular to the optical axis direction. Conversely, when a current in a second direction opposite to the first direction is applied to the second-second coil 442, the second-second coil 442 may move in the other direction of the first direction (y-axis direction) perpendicular to the optical axis direction through electromagnetic interaction with the driving magnet 410. At this time, the second-second coil 442 may move the image sensor 330 in the other of the second direction perpendicular to the optical axis direction.

FIG. 22 is a view for explaining the driving of an image sensor of a camera device according to the present embodiment is rolled around the z-axis.

When the current in the first direction is applied to the second-first coil 441 and the second-second coil 442 of the camera device 10 according to the present embodiment, the second-first coil 441 and the second-second coil 442 may rotate in one direction about the optical axis through electromagnetic interaction with the driving magnet 410 (refer to c of FIG. 22). At this time, the second-first coil 441 and the second-second coil 442 may rotate the image sensor 330 in one direction about the optical axis. At this time, one direction may be counterclockwise. Conversely, when a current in a second direction opposite to the first direction is applied to the second-first coil 441 and the second-second coil 442, the second-first coil 441 and the second-second coil 442 may rotate in other directions about the optical axis through electromagnetic interaction with the driving magnet 410. At this time, the second-first coil 441 and the second-second coil 442 may rotate the image sensor 330 in other direction about the optical axis. At this time, the other direction may be clockwise.

Hereinafter, an optical device according to the present embodiment will be described with reference to the drawings.

FIG. 23 is a perspective view of an optical device according to the present embodiment, and FIG. 24 is a perspective view of an optical device according to the present embodiment as viewed from a different direction from FIG. 23.

The optical device 1 may comprise any one or more among hand phone, portable phone, portable terminal, mobile terminal, smart phone, smart pad, portable smart device, digital camera, laptop computer, digital broadcasting terminal, personal digital assistants (PDA), portable multimedia player (PMP), and navigation. The optical device 1 may comprise any device for photographing an image or a picture.

The optical device 1 may comprise a main body 20. The optical device 1 may comprise a camera device 10. The camera device 10 may be disposed in the main body 20. The camera device 10 may photograph a subject. The optical device 1 may comprise a display 30. The display 30 may be disposed in the main body 20. The display 30 may output any one or more of a video and an image photographed by the camera device 10. The display 30 may be disposed on a first surface of the main body 20. The camera device 10 may be disposed on any one or more of a first surface of the main body 20 and a second surface opposite to the first surface.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
a first substrate;
an image sensor configured to move in a direction perpendicular to an optical axis with respect to the first substrate;
a housing disposed on the first substrate;
a bobbin disposed in the housing and configured to move in a direction of the optical axis;
a sensing substrate disposed on the housing; and
a connection substrate connecting the image sensor and the first substrate,
wherein the connection substrate comprises a first terminal part connected to the first substrate and a second terminal part connected to the sensing substrate, and
wherein the connection substrate comprises a first coupling region coupled to the first substrate, a second coupling region configured to move together with the image sensor, and a connection part connecting the first coupling region and the second coupling region.

2. The camera device of claim 1, comprising:

a second substrate electrically connected with the image sensor; and a holder coupled with the second substrate.

3. The camera device of claim 2, wherein the second coupling region is coupled to the holder, and wherein the second terminal part is disposed on the first coupling region.

4. The camera device of claim 1, comprising:

a sensing magnet disposed on the bobbin; and a Hall sensor or a driver IC configured to sense the sensing magnet and disposed on the sensing substrate.

5. A camera device comprising:

a fixed part comprising a first substrate and a sensing substrate;

a first moving part configured to move in an optical axis direction with respect to the fixed part;

a second moving part configured to move in a direction perpendicular to the optical axis direction; and a connection substrate connecting the fixed part and the second moving part, wherein the connection substrate comprises a first terminal part connected to the first substrate and a second terminal part connected to the sensing substrate, and wherein the connection substrate comprises a connection part connected to the second moving part, an extension part extending from the connection part, and a terminal part connected to the extension part and coupled to the first substrate.

6. The camera device of claim 5, wherein the connection substrate is configured to move in a direction perpendicular to the optical axis direction with respect to a first coupling region coupled to the fixed part.

7. The camera device of claim 5, wherein at least a portion of the extension part is configured to move in a direction perpendicular to the optical axis direction with respect to the terminal part.

8. The camera device of claim 5, wherein the second moving part comprises an image sensor, and wherein the first moving part comprises a lens.

9. A camera device comprising:

a fixed part comprising a first substrate;

a first moving part disposed in the fixed part and comprising a lens;

a second moving part comprising an image sensor disposed at a position corresponding with the lens and a second substrate electrically connected with the image sensor;

a first coil configured to move the first moving part;

a second coil configured to move the second moving part;

a connection substrate connecting the first substrate and the second moving part;

a sensing substrate disposed on the fixed part; and a driver IC disposed on the sensing substrate and electrically connected with the first coil, wherein the connection substrate comprises a first terminal and a second terminal, wherein the first terminal of the connection substrate is connected with the first substrate, wherein the sensing substrate is connected with the second terminal of the connection substrate, and wherein the connection substrate comprises a connection part connected with the second substrate, a terminal part coupled with the first substrate, and an extension part connecting the connection part and the terminal part.

10. The camera device of claim 9, wherein the first terminal and the second terminal of the connection substrate are disposed on an outer surface of the connection substrate.

11. The camera device of claim 10, wherein the second terminal of the connection substrate is disposed to be spaced apart from the first terminal on the outer surface of the connection substrate.

12. The camera device of claim 9, wherein the first terminal of the connection substrate is disposed on a lower end of the connection substrate, and wherein the second terminal of the connection substrate is disposed spaced apart from the lower end of the connection substrate.

13. The camera device of claim 9, wherein the second terminal of the connection substrate is disposed above the first terminal in an optical axis direction.

14. The camera device of claim 9, wherein the first terminal and the second terminal are disposed on the terminal part.

15. The camera device of claim 9, comprising a sensing magnet and a correction magnet disposed opposite to each other on the first moving part, wherein the driver IC comprises a sensor configured to detect the sensing magnet, and wherein the driver IC is disposed to face the sensing magnet.

16. The camera device of claim 9, comprising an upper elastic member and a lower elastic member connecting the fixed part and the first moving part, wherein the lower elastic member is disposed below the upper elastic member, wherein the lower elastic member comprises two lower elastic members spaced apart from each other, and wherein the two lower elastic members electrically connect the sensing substrate and the first coil.

17. The camera device of claim 16, wherein the sensing substrate comprises a first terminal connected with the second terminal of the connection substrate, and a second terminal connected with the two lower elastic members.

18. The camera device of claim 17, wherein the second terminal of the connection substrate comprises four second terminals, and wherein the first terminal of the sensing substrate comprises four first terminals coupled with the four second terminals of the connection substrate.

19. The camera device of claim 9, wherein the sensing substrate is bent at least twice in a direction perpendicular to an optical axis direction.

20. An optical device comprising:

a main body;

the camera device of claim 9 disposed on the main body; and a display disposed on the main body and configured to output a video or an image photographed by the camera device.

* * * * *